US006317726B1

United States Patent
O'Shaughnessy

(12) United States Patent
(10) Patent No.: US 6,317,726 B1
(45) Date of Patent: *Nov. 13, 2001

(54) AUTOMATED STRATEGIES FOR INVESTMENT MANAGEMENT

(75) Inventor: James P. O'Shaughnessy, Coscob, CT (US)

(73) Assignee: Netfolio, Inc., Greenwich, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/361,654

(22) Filed: Jul. 27, 1999

Related U.S. Application Data

(63) Continuation-in-part of application No. 08/995,296, filed on Dec. 20, 1997.
(60) Provisional application No. 60/034,089, filed on Dec. 30, 1996.

(51) Int. Cl.⁷ .................................................... G06F 17/60
(52) U.S. Cl. ............................. 705/36; 705/35; 705/37; 705/38
(58) Field of Search .................................. 705/36, 37, 35, 705/38, 39

(56) References Cited

U.S. PATENT DOCUMENTS

| | | | | |
|---|---|---|---|---|
| 5,132,899 | * | 7/1992 | Fox ........................................ | 705/36 |
| 5,761,442 | * | 6/1998 | Barr et al. ............................. | 705/36 |
| 5,819,238 | * | 10/1998 | Fernholz ................................ | 705/36 |
| 5,946,666 | * | 8/1999 | Nevo et al. ............................ | 705/36 |
| 5,978,778 | * | 11/1999 | O'Shaughnessy ...................... | 705/36 |
| 6,035,286 | | 3/2000 | Fried ..................................... | 705/36 |
| 6,061,663 | | 5/2000 | Bloom ................................... | 705/36 |
| 6,064,985 | * | 5/2000 | Anderson ............................... | 705/36 |
| 6,085,175 | | 7/2000 | Gugel ..................................... | 705/36 |

FOREIGN PATENT DOCUMENTS

2298299 * 8/1996 (GB) .............................. G06F/19/00

OTHER PUBLICATIONS

Forbes (NPL) "Investment policy; Securities analysis; Forecasting techniques; Ratio analysis; Books". Forbes v158n6 pp:225 Sep. 9, 1996 CODEN: FORBA5 ISSN: 0015–6914. Author: Kennith Fisher.*

* cited by examiner

Primary Examiner—Vincent Millin
Assistant Examiner—Jeffrey Pwu
(74) Attorney, Agent, or Firm—Elman & Associates

(57) ABSTRACT

The invention is in the field of using a computer to select corporate stocks for investment. Fifty stocks are selected from a database on the basis of certain criteria. The stocks are acquired in equal proportions, and the portfolio is rebalanced at the end of an annual term. Strategy I: market capitalization greater than $172 million (inflation adjusted figure for $150 million in 1994 dollars.); price-to-sales ratio less than 1.5; earnings higher than in previous year; market capitalization greater than market capitalization three months ago; market capitalization greater than market capitalization six months ago; buy stocks with highest one-year stock price appreciation. Strategy II: market capitalization greater than database mean; common shares outstanding greater than database mean; cashflow greater than the database mean. (creating SET A); price-to-sales ratio less than average for SET A; sales greater than 1.5 times the average for the database; no utility companies; buy the 25 or 50 stocks with the best one year stock price appreciation.

26 Claims, 14 Drawing Sheets

| Symbol | Company Name | Rank | Market Capitalization | Price/Sales Ratio | % Price ChangeLast Year |
|---|---|---|---|---|---|
| EVSI | Evans Systems, Inc. | 1 | 51,417,000 | 0.53 | 866.7 |
| AWS | Alba-Waldensian, Inc. | 2 | 52,065,000 | 0.69 | 601.9 |
| PLI | Polyvision Corporation | 3 | 27,438,000 | 0.72 | 239.4 |
| SALT | Salton, Inc. | 4 | 197,235,000 | 0.51 | 236.5 |
| SHRP | Sharper Image Corporation | 5 | 128,439,000 | 0.53 | 229.1 |
| FRNT | Frontier Airlines, Inc. | 6 | 147,072,000 | 0.76 | 223.3 |
| HMGC | HMG Worldwide Corporatio | 7 | 36,016,000 | 0.56 | 215.2 |
| ITGR | Integrity Incorporated | 8 | 26,881,000 | 0.69 | 178.9 |
| CN | Calton, Inc. | 9 | 36,788,000 | 0.35 | 176 |
| ULTE | Ultimate Electronics, Inc. | 10 | 70,337,000 | 0.21 | 155.3 |
| ONPR | One Price Clothing Stores, | 11 | 49,590,000 | 0.15 | 152.7 |
| NM | National Media Corporation | 12 | 168,719,000 | 0.49 | 152.1 |
| TCIX | Total Containment, Inc. | 13 | 29,644,000 | 0.57 | 137.2 |
| ICNT | Incomnet, Inc. | 14 | 32,500,000 | 0.44 | 136.2 |
| MZON | Multiple Zones International | 15 | 137,393,000 | 0.27 | 133.3 |
| RICA | Rica Foods, Inc. | 16 | 59,212,000 | 0.52 | 133.1 |
| MSS | Measurement Specialties, I | 17 | 29,064,000 | 0.84 | 132.6 |
| CACH | Cache, Inc. | 18 | 67,046,000 | 0.46 | 131.3 |
| KWIC | Kennedy-Wilson, Inc. | 19 | 46,652,000 | 0.92 | 127.8 |
| FSFT | Fourth Shift Corporation | 20 | 58,862,000 | 0.86 | 123.6 |
| CGF | Carr-Gottstein Foods Co. | 21 | 98,928,000 | 0.16 | 123 |
| GVP | GSE Systems, Inc. | 22 | 25,330,000 | 0.34 | 110.1 |
| ALGI | American Locker Group Inc | 23 | 38,465,000 | 0.83 | 108.1 |
| ATEC | ATEC Group, Inc. | 24 | 54,864,000 | 0.3 | 103.2 |
| NKID | Noodle Kidoodle, Inc. | 25 | 59,787,000 | 0.62 | 103.1 |
| OHB | Orleans Homebuilders, Inc. | 26 | 26,971,000 | 0.19 | 100 |
| MAJ | Michael Anthony Jewelers, | 27 | 30,121,000 | 0.22 | 96.7 |
| ITN | InterTAN, Inc. | 28 | 126,475,000 | 0.23 | 96.4 |
| PRFM | Perfumania, Inc. | 29 | 33,614,000 | 0.19 | 91.8 |
| CCLNF | Commodore Holdings Limit | 30 | 45,570,000 | 0.71 | 88.6 |
| NTPL | Netplex Group Inc | 31 | 28,856,000 | 0.65 | 87.3 |
| RTST | The Right Start, Inc. | 32 | 27,155,000 | 0.78 | 86.8 |
| HANS | Hansen Natural Corporatio | 33 | 40,875,000 | 0.76 | 83.6 |
| BAMM | Books-A-Million, Inc. | 34 | 201,329,000 | 0.58 | 81 |
| CHI | Furr's/Bishop's, Incorporate | 35 | 48,676,000 | 0.26 | 78.6 |
| WRPC | WRP Corporation | 36 | 40,645,000 | 0.66 | 74.1 |
| TSIC | Tropical Sportswear Int'l Co | 37 | 165,539,000 | 0.51 | 74 |
| DKWD | D & K Healthcare Resource | 38 | 86,618,000 | 0.12 | 71.9 |
| ELT | Elscint Limited | 40 | 212,108,000 | 0.69 | 70.2 |
| DEMP | Drug Emporium, Inc. | 39 | 93,908,000 | 0.11 | 70.2 |
| WHI | Washington Homes, Inc. | 41 | 50,637,000 | 0.17 | 70.1 |
| CGL.A | Cagle's, Inc. | 42 | 84,424,000 | 0.25 | 69.8 |
| NAIG | National Information Group | 43 | 62,255,000 | 0.94 | 67 |
| BGR | Bangor Hydro-Electric Com | 44 | 95,719,000 | 0.49 | 65 |
| VGHN | Vaughn Communications, I | 45 | 40,055,000 | 0.46 | 63.5 |
| LEAP | Leap Group, Inc. | 46 | 33,998,000 | 0.87 | 63.4 |
| MCSC | Miami Computer Supply Co | 47 | 236,658,000 | 0.75 | 63 |
| REXL | Rexhall Industries, Inc. | 48 | 25,010,000 | 0.39 | 61.7 |
| HPSC | HPSC, Inc. | 49 | 35,005,000 | 0.98 | 61.4 |
| ODETA | Odetics, Inc. | 50 | 55,519,000 | 0.77 | 60.4 |

Fig. 7

AUTOMATED STRATEGIES FOR INVESTMENT MANAGEMENT

CROSS REFERENCE TO RELATED APPLICATION

This application is a continuation in part of application Ser. No. 08/995,296, (filed: Dec. 20, 1997). Application Ser. No. 08/995,296 is a non-provisional application claiming priority under 35 U.S.C. § 119(e) from Provisional U.S. patent application Ser. No. 60/034,089, filed Dec. 30, 1996. Both the provisional and non-provisional are incorporated herein by reference.

FIELD OF THE INVENTION

The invention is in the field of using a computer to select corporate stocks for investment.

BACKGROUND OF THE INVENTION

Knowing how a particular investment strategy performed historically gives one the vital information one needs on its risk, variability, and persistence of returns. Before the commencement of the inventor's work, there was no widely available comprehensive guide to which strategies are long-term winners and which are not. The inventor had access to the historical S&P Compustat database of United States stock market information: forty-three years of results for Wall Street's most popular investment strategies.

It took the combination of fast computers and huge databases to prove that a portfolio's returns are essentially determined by the factors that define the portfolio. Before computers, it was almost impossible to determine what strategy guided the development of a portfolio. The number of underlying factors (e.g. price-to-earnings ratio, dividend yield) that an investor could consider seemed endless. The best one could do was look at portfolios in the most general ways. With computers, one can also test combinations of factors over long periods of time, showing what one can expect in the future from any given investment strategy.

History shows that traditional active management does not work. The majority of actively managed funds do not beat the S&P 500. Passive index fund managers have seen their assets rise as a result, from $10 billion in 1980 to over $250 billion in 1990.

There is no product similar to or the same as the method or apparatus of the present invention. Since the magnitude of the sums involved and the complexity of the relevant investment information, it is very desirable to use an objective rule-based strategy and system for automating, to the extent practicable, the conduct of this decision-making.

SUMMARY OF THE INVENTION

The data presented by the inventor proves that the market clearly and consistently rewards certain attributes (e.g., stocks with low price-to-sales ratios) and clearly and consistently punishes others (e.g. stocks with high price-to-sales ratios) over long periods of time. A paradox remains: tests show high return predictability, but 80 percent of traditionally managed mutual funds fail to beat the S&P 500. Models beat human forecasters because they reliably and consistently apply the same criteria time after time.

Stock market decisions and portfolio constructions are served by a methodical scientific method. Certain rules help in this process. First, all models must use explicitly stated rules without ambiguity or allowance for a private or unique interpretation of the rule. Second, the rule must be stated explicitly and publicly so anyone with the time, money, data, equipment and inclination can reproduce the results. Third, someone using the same rules and the same reliable database must get the same results. Fourth, the results must be consistent over time; long-term results cannot owe all their benefits to a few years. Fifth, the rule must be intuitive and logical and not be derived from the data.

The inventor used the S&P Compustat Active and Research Database from 1950 through 1994. The inventor used certain methods to evaluate how different rules for constructing portfolios worked over these periods. Certain choices were made regarding size of the portfolio (50 stocks for most strategies), market capitalization (generally, requiring a minimum of $150 million), and annual rebalancing.

Size of the portfolio. As evaluated, stock portfolios contained 50 stocks, some of the portfolios in this application contain 10, 25, 30, 40 or 50 stocks. Researchers J. L. Evans and S. H. Archer found most of the benefits of diversification come from as few as 16 stocks. One wants to avoid holding too many or too few stocks. Larger or smaller portfolios are within the scope of the inventor's invention.

Market Capitalization. The inventor primarily studied two groups. The first stock group includes only stocks with a market capitalization in excess of $150 million (adjusted for inflation); it is called All Stocks throughout this application. The inventor chose $150 million after consulting a trader at a large Wall Street brokerage who felt it was the minimum necessary if he was investing $100 million in 50 stocks in 1995. This figure avoids focusing on tiny stocks and focuses only on those stocks which a professional investor could by without running into liquidity problems. A stock with a market capitalization of $27 million in 1950 is the equivalent of a $150 million stock at the end of 1994 and each is the equivalent of a stock with a market capitalization of $172 adjusted for inflation. The second stock group includes larger, better-known stocks with market capitalizations greater than the database average (usually the top 16 percent of the database by market capitalization); it is called Large Stocks throughout the application.

Annual Rebalancing. The portfolios studied are constructed and rebalanced annually. Stocks are equally weighted with no adjustment for other variables. For example, if $1,000,000 is invested in 50 stocks, a $20,000 investment is made in each stock. Dividends are re-invested in proportion with the original proportions. At the end of the year, all of the stocks may be sold and replaced with another fifty stocks that meet the criteria of the strategy. Throughout the application, rebalancing refers to this process. Of course, for tax purposes, an investor must be careful in rebalancing that one does not unnecessarily sell and reacquire shares of stock in an existing portfolio when performing the rebalancing. A year was chosen since it is long enough to minimize effects of commissions and costs of rebalancing the portfolio. A term as long as two years or as short as three months could be used as the period after which one rebalances the portfolio in accordance with some embodiments of the present invention.

Sharpe Ratios. The inventor uses the well-known Sharpe ratio of reward to risk, with higher numbers indicating better risk-adjusted returns. To arrive at the Sharpe ratio, take the average return from a strategy, subtract the risk-free rate of interest, and then divide that number by the standard deviation of return.

TABLE 1

|  | Average | Standard Deviation |
|---|---|---|
| S&P 500 | 14.25% | 12.01% |
| T-Bills | 6.15% | 2.07% |
| S&P 500 Minus T | 8.10% | 11.68% |
| Strategy | 19.06% | 24.37% |
| T-Bills | 6.15% | 2.07% |
| Strategy Minus T | 12.91% | 24.75% |

See Table 1.

The risk-adjust return for the S&P 500 equals 8.10% divided by 12.01% or 67.44.

The risk-adjust return for the strategy equals 12.91% divided by 24.37% or 52.97.

Market Capitalization Matters. A comparison of All Stocks (stocks with a market capitalization of more than $150 million) and Large Stocks (stocks with a market capitalization higher than the database average) reveals that size matters. All Stocks outperformed Large Stocks.

For purposes of simplicity in this application, the yield of a $10,000 investment over the 43 years (or the 40 years for those strategies using 5-year factors) in millions and the resultant Sharpe Ratio is presented. The portfolio is rebalanced annually. Stocks are equally weighted, all dividends are reinvested, and all variables such as common shares outstanding are time-lagged to avoid look-ahead bias. For those interested in viewing more of the underlying data, the inventor suggests that the reader consult his commercially available book, *What Works on Wall Street* (Author, James P. O'Shaughnessy. Published by McGraw-Hill, 1997).

A more detailed analysis of how capitalization affects stocks' performance follows (in millions ($1M), from an initial investment of $10,000 invested over 43 years) in Table 2 and Table 2A.

TABLE 2

| Category | $1M's | Sharpe Ratio |
|---|---|---|
| All Stocks | 1.80 | 47 |
| Large stocks | 1.00 | 45 |
| S&P 500 | 1.00 | 44 |
| Cap < $1b | .80 | 40 |
| 500M < cap < $1b | .75 | 39 |
| 250M < cap < 500M | 1.30 | 45 |
| $100M < cap < $250M | 1.30 | 42 |
| $25M < cap < $100M | 1.70 | 41 |
| Cap < $25M | 29.10 | 57 |

TABLE 2A

| Category | $1M's | Sharpe Ratio |
|---|---|---|
| All Stocks | 2.7 | 49 |
| Large stocks | 1.6 | 48 |
| S&P 500 | 1.7 | 48 |
| Cap < $1b | 1.6 | 48 |
| 500M < cap < $1b | 1.9 | 47 |
| 250M < cap < 500M | 3.4 | 50 |
| $100M < cap < $250M | 3.4 | 46 |
| $25M < cap < $100M | 7.8 | 48 |
| Cap < $25M | 806 | 64 |

Although, small cap stocks have been favored in many studies, All Stocks outperforms small caps. A great deal of the benefit of small cap stocks comes from stocks in the microcap (capitalization less than $25 million) range. The stocks are too small for mutual fund to buy and far too numerous for an individual to tackle. Large Stocks performed in a similar fashion to the S&P 500, with slightly better risk and almost equivalent yield.

Computer. The present invention may be utilized on a general purpose computer, such an IBM PC, VAX, Mac or other computer known to those in the art. Additionally, the sorting, filtering, and criteria could be encoded onto special purpose chips for creating special purpose hardware for carrying out the present invention. The present invention could be implemented on a wide area network, local area network, through a dial-up connection to a dedicated machine, through an Internet or Intranet connection.

Value Factors include the following: low price-to-earnings (PE) ratios; low price-to-book ratios; low price-to-cashflow ratios; low price-to-sales ratios; dividend yields.

Price-to-Earnings Ratios. For many on Wall Street, buying stock with low price-to-earnings (PE) ratios is a favored indicator. One finds a stock's current PE ratios by dividing the price by the current earnings per share. The higher the PE, the more investors are paying for earnings, and the larger the implied expectations for future earnings growth. A stock's PE ratio is one of the most common measurements of how cheap or expensive it is relative to other stocks.

$10,000 is invested on Dec. 31, 1951 in the 50 stocks with the lowest price-to-earnings ratios. The portfolio is rebalanced each year to hold the 50 stocks with the lowest PE ratios in any given year. For the yield, and risk-adjusted yield, see Table 3 and Table 3A.

Note that Large Stocks with Low PE outperformed Large Stocks and had a better Sharpe ratio, while Low PE All Stocks suffered a worse return and with worse risk. Small companies can have a string of spectacular earnings gains on their way to becoming large companies. It's sensible for investors to award them with higher PE ratios. Since low PE ratios indicate lower investor expectations for earnings growth, a small company with a low PE ratio might have very limited prospects. High PE Ratios are dangerous. Both All Stocks and Large Stocks outperform the High PE All Stocks and the High PE Large Stocks.

TABLE 3

| Category | $1M's | Sharpe Ratio |
|---|---|---|
| Low PE All Stocks | 1.23 | 37 |
| Low PE Large stocks | 2.29 | 47 |
| High PE All Stocks | .39 | 25 |
| High PE Large stocks | .47 | 29 |

TABLE 3A

| Category | $1M's | Sharpe Ratio |
|---|---|---|
| Low PE All Stocks | 2.12 | 40 |
| Low PE Large stocks | 3.79 | 50 |
| High PE All Stocks | .56 | 27 |
| High PE Large stocks | .65 | 31 |

Price-to-book ratios (P/B). Find price-to-book by dividing the current price of the stock by the book value per share. Over the long term, the market rewards stocks with low price-to-book ratios and punishes those with high ones. See Table 4.

TABLE 4

| Category | $1M's | Sharpe Ratio |
|---|---|---|
| Low P/B All Stocks | 3.59 | 47 |
| Low P/B Large stocks | 3.42 | 54 |
| High P/B All Stocks | .29 | 23 |
| High P/B Large stocks | .56 | 30 |

TABLE 4A

| Category | $1M's | Sharpe Ratio |
|---|---|---|
| Low P/B All Stocks | 5.49 | 49 |
| Low P/B Large stocks | 5.03 | 56 |
| High P/B All Stocks | .38 | 24 |
| High P/B Large stocks | .89 | 33 |

Price-to-cashflow (P/C). Price-to-cashflow is yet another measure of whether a stock is cheap or not. Find cashflow by adding income (before extraordinary items) to depreciation and amortization. The price-to-cashflow ratio is the market value of the stock divided by total cashflow. See Table 5.

TABLE 5

| Category | $1M's | Sharpe Ratio |
|---|---|---|
| Low P/C All Stocks | 2.95 | 45 |
| Low P/C Large stocks | 3.62 | 53 |
| High P/C All Stocks | .21 | 20 |
| High P/C Large stocks | .55 | 30 |

TABLE 5A

| Category | $1M's | Sharpe Ratio |
|---|---|---|
| Low P/C All Stocks | 4.48 | 47 |
| Low P/C Large stocks | 5.77 | 56 |
| High P/C All Stocks | .33 | 23 |
| High P/C Large stocks | .79 | 31 |

Price-to-Sales (PSR). Price-to-Sales Ratios is a good measure. The price of the company is measured against annual sales (instead of earnings). Investors who buy low PSR stocks buy them because they believe they're getting a bargain. See Table 6.

TABLE 6

| Category | $1M's | Sharpe Ratio |
|---|---|---|
| Low PSR All Stocks | 5.93 | 52 |
| Low PSR Large stocks | 2.55 | 49 |
| High PSR All Stocks | .07 | 11 |
| High PSR Large stocks | .41 | 27 |

TABLE 6A

| Category | $1M's | Sharpe Ratio |
|---|---|---|
| Low PSR All Stocks | 8.25 | 53 |
| Low PSR Large stocks | 3.85 | 52 |
| High PSR All Stocks | .09 | 12 |
| High PSR Large stocks | .64 | 30 |

Dividend yields. Find a stock's dividend yield by dividing the indicated annual dividend rate by the current price of the stock. The result is then multiplied by 100 to make it a percentage. Thus if a company pays an annual dividend of $1, and the current price of the stock is $10, the dividend is 10 percent. See Table 7 and Table 7A.

TABLE 7

High Yielding Dividends (excluding utilities)

| Category | $1M's | Sharpe Ratio |
|---|---|---|
| All Stocks | 1.11 | 39 |
| Large stocks | 2.01 | 51 |

TABLE 7A

High Yielding Dividends (excluding utilities)

| Category | $1M's | Sharpe Ratio |
|---|---|---|
| All Stocks | 1.6 | 49 |
| Large stocks | 2.90 | 54 |

The returns of the high yielding large stocks are entirely different from their universe with virtually the same risk. The 50 highest-yielding stocks beat the universe 91 percent of the time over all rolling 10-year periods. Investors who buy higher yielding stocks should stick to large, better-known companies, which usually have the stronger balance sheets and longer operating histories that make higher dividends possible. Small stocks with high dividend yields may be in that position because their prices have fallen. Far from representing a bargain, their high dividend yields may be an indicator of more trouble to come.

Value Strategy Implications. The forty-three years of data show that the stock market methodically rewards certain types of stocks while punishing others. Stocks with low price-to-book, price-to-cashflow, and price-to-sales ratios dramatically outperform the All Stocks universe. Just as importantly, those with high price-to-book, price-to-cashflow, and price-to-sales ratios do dramatically worse. Stocks with low price-to-earnings ratios and those with high dividend yields fail to beat All Stocks. Buying the 50 stocks with the lowest price-to-sales ratios was the only strategy that beat the All Stocks universe on a risk-adjusted basis. The other value strategies came close, with the low price-to-book group matching All Stocks' Sharpe ratio of 47, and the low price-to-cashflow group close behind with a Sharpe ratio of 45. All the Large Stocks value strategies beat the Large Stocks universe on an absolute and risk-adjusted basis, and they did so at least 88 percent of the time over all rolling 10-year periods.

Growth investors want high earnings and sales growth with prospects of more of the same. They usually are not concerned if stock has a high PE ratio, reasoning that a company can grow its way out of short-term overvaluations. Growth investors often award high prices to stocks with rapidly increasing earnings.

One-Year-Earnings-Per-Share Percentage Changes. One-year-earnings-per-share percentage changes are a poor lone factor upon which to base investment decisions. See Table 8 and Table 8A.

TABLE 8

1-year earnings-per-share percentage changes

| Category | $1M's | Sharpe Ratio |
|---|---|---|
| Best All Stocks | .91 | 34 |
| Best Large stocks | .39 | 28 |
| Worst All Stocks | 1.13 | 38 |
| Worst Large Stocks | 1.12 | 43 |

TABLE 8A 1-year earnings-per-share percentage changes

| Category | $1M's | Sharpe Ratio |
|---|---|---|
| Best All Stocks | 1.29 | 34 |
| Best Large stocks | .57 | 28 |
| Worst All Stocks | 1.49 | 38 |
| Worst Large stocks | 1.48 | 43 |

The implication is that buying stocks simply because they have great earnings gains is a losing proposition. Stocks with the highest 1-year earnings gains almost always have the highest prince-to-earnings ratios, another indicator that poor performance lies ahead. While their returns are slightly higher than those with the best earning changes, there is no compelling theory to justify buying stocks with the worst earnings changes.

Best 5-year earnings gains. Some analysts believe that a 1-year change in earnings is meaningless and that one should focus on 5-year growth rates. Using 5-year earnings gains as the only determinate will lead to disappointing results. See Table 9 and Table 9A.

TABLE 9

| Category | $1M's | Sharpe Ratio |
|---|---|---|
| Best 5-year earnings gains All Stocks | .35 | 26 |
| Best 5-year earnings gains Large stocks | .37 | 28 |

TABLE 9A

| Category | $1M's | Sharpe Ratio |
|---|---|---|
| Best 5-year earnings gains All Stocks | | |
| Best 5-year earnings gains Large stocks | .61 | 23 |

Net profit margins are an excellent gauge of a company's operating efficiency and ability to compete successfully with other firms in its field. Thus many believe that firms with high profit margins are better investments, since they are the leaders in their industries. One finds net profit margins by dividing income before extraordinary items (A company's income after all expenses but before provisions for dividends) by net sales. This is then multiplied by 100 to get a percentage. See Table 10 and Table 10A. History shows using high profit margins as the only determinate in buying a stock will lead to disappointing results.

TABLE 10

| Category | $1M's | Sharpe Ratio |
|---|---|---|
| Best profit margins All Stocks | .74 | 34 |
| Best profit margins Large stocks | .75 | 40 |

TABLE 10A

| Category | $1M's | Sharpe Ratio |
|---|---|---|
| Best profit magins All Stocks | 1.08 | 37 |
| Best profit margins Large stocks | 1.09 | 43 |

High return on equity (ROE) is a hallmark of a growth stock. One finds return on equity by dividing common stock equity into income before extraordinary items (a company's income after all expenses but before provisions for dividends). One then multiplies them by 100 to express the term as a percentage. Ilere is used common liquidating equity (called CEQL in Compustat) as a proxy for common equity.

As with high profit margins, many believe that a high return on equity (ROE) is an excellent gauge of how effectively a company invests shareholders' money. The higher the ROE, the better the company's ability to invest one's money, and presumably, the better an investment the stock will be. See Table 11 and Table 11A.

TABLE 11

| Category | $1M's | Sharpe Ratio |
|---|---|---|
| Best ROE All Stocks | .35 | 26 |
| Best ROE Large stocks | .37 | 28 |

TABLE 11A

| Category | $1M's | Sharpe Ratio |
|---|---|---|
| Best ROE All Stocks | 2.51 | 41 |
| Best ROE Large stocks | 1.14 | 39 |

ROE provides an excellent example of the importance of looking at the long-term when judging a strategy's effectiveness. An investor just out of college at the end of 1964 studying how stocks with high return on equity perform find encouraging evidence. The 50 highest ROE stocks from both the All and Large Stocks universe outperformed their respective benchmarks in the previous decade. Over the longer period, however, ROE was a poor sole performance indicator.

Relative Price Strength. Using strong price momentum as a determinate runs counter to efficient market theories. One cannot use past prices to predict future prices, according to efficient market theory. Conversely, another school of thought says one should buy stocks that have been most battered by the market. In this application, relative strength and price performers will be used interchangeably. See Table 12 and Table 12A for comparison of 1-year relative strength changes.

TABLE 12

1-year relative strength

| Category | $1M's | Sharpe Ratio |
|---|---|---|
| Best All Stocks | 3.31 | 43 |
| Best Large stocks | 2.98 | 49 |
| Worst All Stocks | .03 | 3 |
| Worst Large stocks | .49 | 29 |

TABLE 12A 1-year relative strength

| Category | $1M's | Sharpe Ratio |
| --- | --- | --- |
| Best All Stocks | 4.11 | 43 |
| Best Large stocks | 4.43 | 51 |
| Worst All Stocks | .04 | 5 |
| Worst Large stocks | .61 | 30 |

While All Stocks Best 1-year relative strength had an impressive yield, it had a high standard deviation and therefore high risk that brought the Sharpe ratio to 43, under the All Stocks universe's 47. Large Stocks Best 1-year relative strength had an impressive yield with slightly more risk than the Large Stocks universe: the resultant 49 Sharpe ratio is higher than the Large Stocks universe's 45.

Price momentum conveys different information about the prospects of a stock and is a much better indicator than factors such as earnings and growth rates. Worst 1-year price performance is dramatically outperformed by the market. See Table 12 and Table 12A.

Instead of focussing on the effects of either a single growth or value factor, using several factors allows one to enhance performance or reduce risk, depending on one's goal.

From All Stocks with a PE ratio below 20, take the 50 stocks with the best 1 year price appreciation. Or from All Stocks with a price-to-book ratio below 1, take the 50 stocks with the best 1 year price appreciation. Either multi-factor analysis outperforms All Stocks, and outperforms either of the factors that comprise it (i.e. low PE ratio or best price appreciation). See Table 13 and Table 13A.

TABLE 13

| Category | $1M's | Sharpe Ratio |
| --- | --- | --- |
| 50 Stocks with PE ratios below 20 and best 1 year price appreciation | 8.6 | 55 |
| 50 stocks with price-to-book ratio below 1 and best 1 year price appreciation | 10.6 | 61 |
| All Stocks PSR<1 Top 50 1-year price Appreciation | 14.1 | 62 |
| All Stocks | 1.7 | 47 |
| Large Stocks PSR<1 Top 50 1-year price Appreciation | 3.6 | 57 |
| Large Stocks | 1.0 | 45 |

TABLE 13A

| Category | $1M's | Sharpe Ratio |
| --- | --- | --- |
| 50 Stocks with PE ratios below 20 and best 1 year price appreciation | 22.72 | 65 |
| 50 stocks with price-to-book ratio below 1 and best 1 year price appreciation | 18.63 | 64 |
| All Stocks PSR<1 Top 50 1-year price Appreciation | 23.40 | 64 |
| All Stocks | 2.68 | 49 |
| Large Stocks PSR<1 Top 50 1-year price Appreciation | 5.18 | 59 |
| Large Stocks | 1.60 | 48 |

Price to sales ratio also performs well when joined with relative strength. In this model, Price to Sales ratio is less than 1. And then stocks are selected by top 1-year price appreciation. The return on All Stocks was higher than the return on Large Stocks. See Table 13 and Table 13A.

However, just cumulating additional factors does not increase the performance: if to one took Large Stocks with PE ratios below 20 and positive earnings gains for the year and bought the 50 with the best 1-year price performance, one would actually earn less than if one bought the low PE, high relative strength stocks alone. The addition of positive earnings gains hurt performance in this instance. More factors do not necessarily mean better performance.

Buying stocks with strong 1-year earnings gains and strong relative price strength outperforms the All Stocks universe. A two-factor model that requires stocks from All Stocks to have 1-year earnings gains exceeding 25 percent and then buys the 50 with the best 1-year price performance also outperforms the All Stocks universe. See Table 14 and Table 14A.

TABLE 14

| Category | $1M's | Sharpe Ratio |
| --- | --- | --- |
| (all Stocks) 1-year earnings; gains above 25%; Top 50 1-year price Appreciation | 6.3 | 50 |
| (all Stocks) ROE>15; Top 50 1-yearPrice appreciation | 9.4 | 55 |
| All Stocks | 1.7 | 47 |
| (Large Stocks) ROE>15; Top 50 1-year Price appreciation | 2.3 | 45 |

TABLE 14A

| Category | $1M's | Sharpe Ratio |
| --- | --- | --- |
| (all Stocks) 1-year earnings; gains above 25%; Top 50 1-year price Appreciation | | |
| (all Stocks) ROE>15; Top 50 1-yearPrice appreciation | 14.38 | 56 |
| All Stocks | 2.68 | 49 |
| (Large Stocks) ROE>15; Top 50 1-year Price appreciation | 3.92 | 49 |

This model was not able to be tested in the Large Stocks universe because in many years fewer than 50 Large Stocks had earnings gains above 25%. Other growth variables work better. Buying the 50 stocks from the All Stocks universe with the best ROE didn't beat the market, but adding a high ROE factor to a relative strength model enhanced returns even more than the earnings gains model. See Table 14. For large stocks, results were less striking: higher yield was compensated by higher risk to yield the same Sharpe ratio for the strategy v. the Large Stock universe. See Table 14 and Table 14A. Buying the lower price-to-sales stocks from All Stocks is the best performing single value factor.

"Value Model 1"
1. Price to book ratios below 1.5
2. Dividend yield must exceed the Compustat average for any given year. This effectively limits one to the upper 20 percent of the database by dividend yield.
3. Price-to-earnings ratios are below the Compustat database average for any given year.
4. Price-to-cashflow ratios are the lowest in the All Socks universe. See Table 14.

While the yield of Value Model 1 was not as high as Low price-to-sales, the risk was lower, and the result a higher Sharpe ratio for Value Model 1.

The choice of several of the right factors can reduce risk while maintaining similar returns.

Value Model 2 uses low price-to-sales ratios as its final factor:
1. Dividend yields must exceed Compustat mean.
2. The stock's price change in the previous year must be positive (Find this by dividing the current year's price by the preceding year's price so the result is greater than 1).

This guarantees that none of the stocks' prices decreased in the previous year.

3. The stocks have the lowest price-to-sales ratios in the All Stocks universe. See Table 15.

TABLE 15

| Category | $1M's | Sharpe Ratio |
|---|---|---|
| Value Model 1 | 5.5 | 53 |
| Low Price-to-sales | 5.9 | 52 |
| Value Model 2 | 7.6 | 59 |
| Value Model 3: Market leaders; Top 50 dividend yield | 4.1 | 63 |

History shows that a portfolio of market-leading stocks that possess attractive value ratios, particularly those with high dividend yields, consistently beat the market at similar levels of risk. A market leading company is a large, well-known company with sales well above the average. It usually also has strong cashflows and large numbers of shares available to the public. These market leading firms are considerably less volatile than the market as a whole. While high dividend yields alone do not add value to stocks from the All Stocks universe, when combined with large market-leading firms they improve performance dramatically at risk levels that are virtually the same as the market. Market leading stocks:

1. come from the Large Stocks Universe;
2. have more common shares outstanding than the average stock in the Compustat database;
3. Cashflows per share exceed the Compustat mean;
4. Sales are 1.5 times the Compustat mean;
5. utilities are eliminated so they don't dominate the list.

High PE ratios pulled down even the market's leaders, while low PE ratios help. High yield works better still: yielding $4.1M and a Sharpe ratio of 63 due to the extremely low volatility.

The most extraordinary thing about this high-yield strategy is that the worst it ever did was a loss of 15 percent. That's nearly half Large Stocks largest annual loss of 26.7 percent. This strategy outperformed Large Stocks in 8 of the 11 bear market years, and never had a negative 5-year return. It had only one 10-year period in which it failed to beat Large Stocks, then losing to the group only by a miniscule 0.78 percent.

This strategy beat Large Stocks in 9 of the 13 years in which the market gains exceeded 25 percent Indeed, in the super bull years of 1954, 1958, and 1975, when Large Stocks gained 40 percent or more, the strategy always did better. This implies that large well-known market-leading companies are much better investments when they have a value characteristic like low PE ratio or low price-to-cashflow ratio, but the best criterion is dividend yield.

The returns from buying the 50 market-leading stocks with the highest dividend yields are so outstanding that this Value Model 3 should serve as a Cornerstone Value Strategy for all portfolios. The reasons are numerous. The strategy sticks to large well-known companies, yet does four times as well as the Large Stocks universe while taking virtually the same risk. It has the highest risk-adjusted return of all strategies examined. The biggest projected loss is 18.17 percent, lower than the Large Stocks' worse projected loss of 19.73 percent. The maximum projected gain for the strategy is 50.82 percent compared with Large Stocks' 44.97 percent. The strategy does better than Large Stocks in bull and bear markets, leading the market in most bull years and providing a cushion in bear years.

Finally, the strategy's high returns coupled with low risk and persistence of returns make it a natural replacement for investors indexing their portfolios to the S&P 500 or other Large Stocks style indexes. See Table 15.

A Cornerstone Growth should complement the Cornerstone Value (Value Model 3) strategy: a high risk-adjusted return to justify the increased volatility.

Growth Model 1

All stocks universe 5-year earnings-per-share growth rates exceeding the Compustat mean Profit margins exceeding the Compustat mean Earning gains 5 years in a row Buy the 50 stocks with the best 1-year relative strength in the All Stocks group See Table 16.

Growth Model 1 loses out to the strategy which buys low price-to-sales stocks with the best relative strength.

One is better off ignoring 5-year compound earnings growth rates and profit margins exceeding the Compustat mean and focusing exclusively on stocks that show persistent earnings growth without regard to magnitude.

Growth Model 2:

Come from All Stocks

Have earnings gains 5 years in a row

Display the best price performance in the All Stocks group

See Table 16.

Uniting persistence with low price-to-sales results in a strategy that performs slightly better than low price-to-sales alone while reducing risk.

Growth Model 3:

1. All Stocks
2. Earnings gains for 5 consecutive years
3. Price-to-sales ratios below 1.5
4. Display the best 1-year price performance in the All Stocks group.

One increases the price-to-sales minimum to 1.5 to allow more of the 'growth' stocks with persistent earnings gains to make the final cut. See Table 16. Growth strategies are less effective with large stocks; one is much better off using the All Stocks universe when pursuing growth strategies. If one can tolerate higher risk, one can beat the market with a strategy like Growth Model 3. It's worth noting that the best growth strategy includes a low price-to-sales requirement, traditionally a value factor. The best time to buy growth stocks is when they are cheap. This strategy will never buy a Netscape or Genentech or Polaroid at 165 times earnings. That why it works so well It forces one to buy stocks just when the market realizes the companies have been overlooked. That's the advantage of using relative strength as the final factor. It gets one to buy just as the market is embracing the stocks, while the price-to-sales constraint ensures that they are still reasonably priced. Indeed the evidence shows that all the most successful strategies include at least one value factor, keeping investors from paying too much for a stock.

The most effective way to diversify a portfolio and enhance risk-adjusted returns is to unite growth and value strategies. Joining growth with value substantially reduces the volatility of growth strategies and increases the capital appreciation potential of less volatile value strategies. It also ensures a diversified portfolio, giving one the chance to perform well regardless of what style is in favor on Wall Street. A $5,000 investment is made in Value Model 3 and Growth Model 3, annually rebalanced gives the following yield. See Table 16.

TABLE 16

| Category | $1M's | Sharpe Ratio |
|---|---|---|
| Growth Model 1 | 3.9 | 56 |
| All Stocks | 1.0 | 43 |
| 50 with price-to-sales below 1 and best 1-year appreciation | 7.9 | 59 |
| Growth Model 2 | 5.1 | 51 |
| Growth Model 3 | 8.1 | 60 |
| 50/50: Value Model 3; Growth Model 3 | 4.9 | 65 |

(note: some periods end at end of 1994)

This unified strategy yields the highest Sharpe ratio examined in this application. The great yield is accomplished with almost the same risk as All Stocks.

Additional research by the inventor has shown the desirability of adding additional factors to the mix.

Strategy I: Cornerstone Growth with additional momentum

1. Market capitalization greater than $172 million (inflation adjusted figure for $150 million in 1994 dollars.)
2. Price-to-sales ratio less than 1.5
3. Earnings higher than in previous year.
4. Market capitalization greater than market capitalization three months ago.
5. Market capitalization greater than market capitalization six months ago.
6. Buy stocks with highest one-year stock price appreciation.

While one-year relative price strength remains an excellent method for identifying stocks with above average potential for the next year—strong empirical support of which is featured in the revised edition of What Works on Wall Street—new research conducted by the applicant reveals that adding layers of strong performance over three and six month previous periods markedly improves performance while reducing variability.

As in the other strategies, the stocks are purchased, held for the appropriate period, and the portfolio rebalanced at the end of the period.

Strategy II: Market Leaders Growth

1. Market capitalization greater than database mean.
2. Common Shares outstanding greater than database mean.
3. Cashflow greater than the database mean. (creating SET A)
4. Price-to-sales ratio less than average for SET A.
5. Sales greater than 1.5 times the average for the database.
6. No utility companies.
7. Buy the 25 or 50 stocks with the best one year stock price appreciation.

As in the other strategies, the stocks are purchased, held for the appropriate period, and the portfolio rebalanced at the end of the period.

This strategy serves as an attractive alternative to indexing to the S&P 500. History shows that a portfolio of market leading stocks that possess attractive value ratios—particularly those with high dividend yields—consistently beats the market with similar levels of risk. A market-leading company is a large, well-known company with sales well above the average. They usually also have strong cashflows and large numbers of shares available to the public. These market-leading firms are considerably less volatile than the market as a whole. Buying the 50 stocks with the highest dividend yields alone did not add value to stocks from the All Stocks universe. However, when combined with large, market-leading firms highest dividend yield improved performance dramatically at risk levels that are virtually the same as the market.

A market-leading stock:

1) Comes from the Large Stocks universe.
2) Has more common shares outstanding than the average stock in the Compustat database.
3) Has cashflows per share exceeding the Compustat mean, and
4) Has sales greater than 1.5 times the Compustat mean.

Finally, utilities are excluded so they don't dominate the list. This greatly limits the number of stocks we can consider. On Dec. 31, 1993, only 328 of the 7919 stocks in the Compustat database met all five requirements. That's just four percent of the database!

High PE Ratios Hinder Even Market Leaders. All value factors are useful in sorting out which market leaders will do well. High PE ratios hurt and low ones help the market leaders' performance. $10,000 invested on Dec. 31, 1951 in the 50 stocks from the market leader group with the highest PE ratios grew to $1,043,895 by the end of 1996, a compound return of just 10.62 percent. That's behind the $1,590,667 you would earn from an investment in the Large Stocks universe, and way behind the $3,363,529 you'd earn with an investment in the Market Leaders universe. Despite a low standard deviation of 17.23 percent, the poor absolute return accounted for a Sharpe ratio of 40. The strategy beat Large Stocks in just 19 of the 45 years studied, or 42 percent of the time. High PE ratios pulled down even the market's leaders.

Low PE Ratios Help. Market leaders with the lowest PE ratios tell an entirely different story. Starting Dec. 31, 1951, $10,000 invested in the 50 stocks from the market leaders group with the lowest PE ratios grows to $5,266,827 by the end of 1996, a compound return of 14.94 percent. That's $4,222,932 more than the high PE group from market leaders. The only thing separating the stocks was PE ratio. The risk was higher for the low PE group, with a standard deviation of 20.10 percent, but because of the higher total return, the Sharpe ratio was a decent 56. All base rates are considerably better, with the low PE group beating the Large Stocks universe in 29 of the 45 years studied, or 64 percent of the time. Long-term base rates are also superior, with the low PE market leaders beating Large Stocks in 32 of the 42 rolling five-year periods and 28 of the 36 rolling ten-year periods.

High Yield Works Better Still. The best returns for market leaders come from stocks with the highest dividend yields. Buying the 50 stocks from the market leaders group with the highest dividend yields does four times as well as an investment in the Large Stocks universe, while assuming very little additional risk.

Starting on Dec. 31, 1951, $ 10,000 invested in the 50 highest-yielding stocks from the market leaders group grew to $6,395,862 by the end of 1996, a compound annual return of 15.44 percent. The remarkable thing here is risk—the standard deviation of 16.95 percent is just slightly higher than Large Stocks' 16.01 percent. Such risk-reward numbers push the Sharpe ratio for the strategy to 67, which is a very good result.

The most extraordinary thing about this high yield strategy is the worst it ever did was a loss of 15 percent. That's nearly half Large Stocks' largest annual loss of 26.70 percent. This strategy outperformed Large Stocks in eight of the 11 bear market years, and never had a negative five-year return. It had only one ten-year period where it failed to beat Large Stocks, then only losing to the group by 0.78 percent.

Two recently identified additional factors work very well with market leading stocks—low price to sales ratios and excellent relative price appreciation. In the revised *What Works on Wall Street*, the inventor show that large stocks do better the lower their price-to-sakes ratios, to wit:

TABLE 17-1

| Decile | $10,000 grows to: | Average Return | Compound Return | Standard Deviation |
|---|---|---|---|---|
| 1 (Lowest PSR) | $4,043,295 | 16.06% | 14.27% | 20.16% |
| 2 | $3,603,757 | 15.71% | 13.98% | 20.18% |
| 3 | $2,029,206 | 13.89% | 12.53% | 17.25% |
| 4 | $1,826,745 | 13.48% | 12.27% | 16.28% |
| 5 | $1,881,358 | 13.64% | 12.34% | 16.78% |
| 6 | $2,058,352 | 13.75% | 12.57% | 16.11% |
| 7 | $866,428 | 11.47% | 10.42% | 14.92% |
| 8 | $800,749 | 11.25% | 10.23% | 14.55% |
| 9 | $596,203 | 10.70% | 9.51% | 15.61% |
| 10 (highest PSR) | $875,010 | 12.31% | 10.45% | 20.12% |
| Large Stocks | $1,590,667 | 13.11% | 11.92% | 16.01% |

Thus the qualification that PSRs are below average. This married well with strength.

Strategy III: Market Leaders low Price-to-sales Ratios
1. Market capitalization greater than database mean.
2. Shares outstanding greater than the database mean.
3. Cashflow greater than the database mean.
4. Sales greater than 1.5 time database mean.
5. Remove utility companies.
6. Buy the 10, 25 or 50 stocks with the lowest price-to-sales ratios.

See discussion of market leaders and effect of low price-to-sales ratios in section discussing Strategy II.

Strategy III, implemented as a 25 stock portfolio acts as a pure play on big-cap value stocks. Since 1959 it has compounded at 16.65%, turning $10,000 invested on Dec. 31, 1958 into $4,729,710. See also, table 17.

Strategy IV: Large-Cap Cornerstone Growth with Additional Momentum
1. Market capitalization greater than the database mean.
2. Earnings higher than in previous year.
3. Price-to-sales ratio less than 1.5.
4. Market capitalization greater than market capitalization three months ago.
5. Market capitalization greater than market capitalization six months ago.
6. Buy the 10, 25 or 50 stocks with the highest one-year stock price appreciation.

Strategy V: Microcap Reasonable Runaways
1. Market capitalization must be greater than $25 million and less than $250 million. (subject to inflation adjustments.)
2. Price-to-sales ratios must be below 1.
3. Buy the 10, 25 or 50 stocks with the highest one-year price appreciation.

What Works on Wall Street, revised edition shows that small stocks-those with market capitalizations between $25 million and $250 million—have performed dramatically better than large stocks. See table 18.

|  | $25m < Capitalization < $100m | $100m < Capitalization < $250m |
|---|---|---|
| Arithmetic average | 19.75% | 16.51% |
| Standard deviation of return | 30.11% | 24.19% |

-continued

|  | $25m < Capitalization < $100m | $100m < Capitalization < $250m |
|---|---|---|
| Sharpe risk-adjusted ratio | 48.00 | 46.00 |
| 3-yr compounded | 14.55% | 13.62% |
| 5-yr compounded | 18.44% | 14.61% |
| 10-yr compounded | 10.88% | 11.17% |
| 15-yr compounded | 11.42% | 12.70% |
| 20-yr compounded | 14.73% | 15.10% |
| 25-yr compounded | 12.52% | 12.35% |
| 30-yr compounded | 14.01% | 12.33% |
| 35-yr compounded | 13.40% | 11.71% |
| 40-yr compounded | 15.14% | 13.26% |
| Compound Annual Return | 15.94% | 13.85% |
| $10,000 becomes: | $7,767,454.00 | $3,432,526.00 |
| Maximum return | 113.42% | 71.22% |
| Minimum return | −37.00% | −35.80% |
| Maximum expected return(1) | 79.97% | 64.89% |
| Minimum expected return(2) | −40.47% | −31.87% |

The applicant reasoned that the low price-to-sales high relative price appreciation combination that has worked so well with regular stocks would do even better when combined with small stocks. An historical test proved this to be the case. To wit:

Strategy VI (Concentrated Growth). Strategy VI (Concentrated Growth) is a 20-stock portfolio that combines the top ten stocks from Strategy II (Market Leaders Growth) Growth with the top ten from Growth Model 1 (Cornerstone Growth). By marrying big and small growth stocks, one gets the best of both worlds when growth strategies are doing well. Since 1959, the strategy has compounded at 22.3%, turning $10,000 invested on Dec. 31, 1958 into $31,364,105 at the end of 1998. This strategy should be used alone only by the most aggressive investors seeking maximum long-term gains.

Strategy VII (Growth Blend). Strategy VII (Growth Blend) is a 30-stock strategy that adds the 10 stocks from Strategy III (Market Leaders low Price-to-sales Ratios) to top ten stocks from Strategy II (Market Leaders Growth) Growth with the top ten from Growth Model 1 (Cornerstone Growth). Strategy VII gives you a portfolio that is 77 percent invested in big and small growth stocks and 33 percent invested in big-cap value stocks. Since 1959, the strategy has compounded at 22.12%, turning $10,000 into 29,601,189. By adding the 10 larger value names, you also decrease overall volatility and increase annual base rates to 83%.

Strategy VIII (Cornerstone Growth). Strategy VIII (Cornerstone Growth) is a 25stock strategy that is a great choice for those who want to focus on small-cap investing. Starting with the All Stocks Universe, we screen for companies that have a minimum market-cap of $172 million, earnings higher than in the previous year From these we select the 25-names with the highest one year price appreciation that also have positive three and six month relative strength. The median market-cap of the Cornerstone Growth Strategy has historically always been below one billion dollars. Since 1959 the strategy has compounded at 21.12%, turning $10,000 invested on Dec. 31, 1958 into $21,282,501 at the end of 1998. The strategy's volatility makes it only appropriate for long-term investors.

Strategy IX (Growth and Value). Strategy IX (Growth and Value) is a 40-stock strategy is ideal for the investor who wants to cover as many styles as possible. It's 50% growth and 50% value, 77% large stocks, 33% small stocks. Strategy IX combines the top ten stocks from Value Model 3 (domestic Cornerstone Value) and the top ten stocks from 10 stocks from Strategy III (Market Leaders low Price-to-sales Ratios) on the value side. The top ten stocks from Strategy II (Market Leaders Growth) and Strategy VIII (Cornerstone Growth) making up the growth allotment. Since 1959 it has compounded at 21.03%, turning $10,000 into 20,706,919. This strategy has the highest one and three year base rates for outperforming the S&P 500 of any of the strategies featured.

Strategy X (Large-cap Concentrated Growth and Value). Strategy X (Large-cap Concentrated Growth and Value) is a 20-stock portfolio that marries the top ten stocks from Strategy II (Market Leaders Growth) with the top ten from Strategy III (Market Leaders low Price-to-sales Ratios). Since 1959, it has compounded at 20.45%, turning $10,000 into $17,052,895. The strategy's base rates are 95% for all rolling three-year periods and 100 percent for all five and ten-year periods.

Strategy XI (Value Blend). Strategy XI (Value Blend) is a 30-stock large-cap blend, with two-thirds of the portfolio in value stocks and one-third in growth. The portfolio combines the ten stocks from Value Model 3 (the highest dividend yields from the domestic Market Leaders universe) with the top ten from Strategy III (Market Leaders low Price-to-sales Ratios) for the value portion. The growth portion is the top ten stocks from Strategy II (Market Leaders Growth). Since 1959, the strategy has compounded at 19.47% turning $ 10,000 into 12,298,356. This strategy is best for more risk-averse investors. It has one of the best one-year minimum price declines (a loss of 16.67%); its performance in the bear market of 1973–74 was excellent (a loss of 16.85% compared to 37.25% for the S&P 500) and it has excellent three-,five- and ten-year base rates. It also has one of the lowest one-year differences from the S&P 500 for those investors who are interested in staying close to the benchmark.

Strategy XII (Concentrated Value). Strategy XII (Concentrated Value) is a 20-stock portfolio used as the value component to a larger portfolio. Since 1959 it has compounded at 19.02%, turning $10,000 invested on Dec. 31, 1958 into $10,588,267 at the end of 1998. Strategy XII combines the ten stocks from Value Model 3 (the highest dividend yields from the domestic Market Leaders universe) with the top ten from Strategy III (Market Leaders low Price-to-sales Ratios).

Strategy XIV (Market Leaders Growth 25-stock Portfolio). Strategy XIV (Market Leaders Growth 25-stock Portfolio). is designed to be a stand alone big-cap growth portfolio. It consists of the 25 stocks with the best one-year price appreciation from our Market Leaders universe that also have price-to-sales ratios below the average for the Market Leaders universe. Since 1959, it has compounded at 17.91% turning $10,000 into $7,276,811. For a big-cap growth strategy, it has nice downside protection, losing just 21.30% in the bear market of 1973–74 and never losing money in any five-year period, Strategy XV (Index Plus). Strategy XV (Index Plus) was designed to have a high correlation to the S&P 500 while still attempting to do better than it over time. It is a 30-stock portfolio that is composed of the ten stocks from the S&P 500 Index with the greatest market capitalization; the top ten stocks from Strategy II: (Market Leaders Growth) and the ten stocks from Strategy III (Market Leaders low Price-to-sales Ratios). Since 1959 it has had a 94% correlation with the S&P 500 with the largest one-year difference from the Index being 7.77%. Nevertheless, it has managed to do significantly better over time, compounding at 17.66%—compared to 12% for the S&P 500—turning $10,000 into $6,677,148.

Strategy XVI (Capital Appreciation). Strategy XVI (Capital Appreciation) is a most conservative strategy, designed to preserve capital while at the same time take advantage of Strategy XI (Value Blend). The strategy invests 50 percent of capital into a laddered T-bill portfolio and 50 percent into the 30 stocks that make up the Strategy XI (Value Blend). The strategy only lost money in 4 of the last 40 years and its largest one-year loss was 5%. In the bear market of 1973–74, it lost just 1.38%, compared to 37.25% for the S&P 500. Its performance has been good however. Since 1959, the strategy has compounded at 13.05%, a full point above the S&P 500 with a dramatically lower standard deviation—9.24%—than the S&P 500's 15.40%.

The present invention contemplates a method for carrying out computerized selection of stocks for an investment portfolio comprising the steps of: (a) accessing a database of stock information with a computer; (b) selecting stocks for an investment portfolio based on information in said database meeting certain criteria; wherein said criteria include selecting stocks of companies with database records indicating: (i) market capitalization in excess of $172,000,000; (ii) price-to-sales ratios lower than 1.5; (iii) annual earnings that are higher than the previous year's annual earnings; (iv) market capitalization higher than the market capitalization three months ago; and (v) market capitalization higher than the market capitalization six months ago; (c) sorting records identifying the stocks which meet said criteria in descending order of one year appreciation in stock price into a sorted list; and (d) making available from the top of said sorted list a listing of a number of stocks.

The present invention contemplates a method for carrying out computerized selection of stocks for an investment portfolio comprising the steps of: (a) accessing a database of stock information with a computer; (b) selecting stocks for an investment portfolio based on information in said database meeting certain criteria; wherein said criteria includes market leaders with the highest dividend yields; wherein market leaders are stocks of companies that are not utilities and that have (i) a market capitalization in excess of the database mean (ii) more common shares outstanding than the average stock in the database (iii) cashflows per share exceeding the database mean; wherein said stocks create SET A; and where price-to-sales ratios are less than average for SET A; and (iv) sales that are greater than 1.5 times the database mean; (c) sorting records identifying the stocks which meet said criteria in descending order of one year appreciation in stock price into a sorted list; and (d) making available from the top of said sorted list a listing of a number of stocks.

The present invention contemplates a method for carrying out computerized selection of stocks for an investment portfolio of the previous paragraph, further comprising the steps of: (e) selecting a second set of stocks for an investment portfolio based on information in said database meeting certain criteria; wherein said criteria include eliminating utilities and selecting stocks of companies with database records indicating: (i) market capitalization in excess of $150,000,000; (ii) more common shares outstanding than database average; (iii) cashflow per share higher than database mean; (iv) sales greater than 1.5 times the database mean; (f) sorting records identifying the stocks in said second set which meet said criteria in descending order of dividend yield into a sorted list; and (g) making available from the top of said sorted list a listing of a number of stocks; (h) making available a listing of said sets of stocks.

The present invention contemplates a method of the previous paragraph, further comprising the steps of: (i) investing half of funds into a laddered T-bill portfolio; (j) investing half of funds into stocks selected in accordance with the previous paragraph The present invention contemplates a method for carrying out computerized selection of stocks for an investment portfolio comprising the steps of: (a) accessing a database of stock information with a computer; (b) selecting stocks for an investment portfolio based on information in said database meeting certain criteria; wherein said criteria includes market leaders with the highest dividend yields; wherein market leaders are stocks of companies that are not utilities and that have (i) a market capitalization in excess of the database mean (ii) more common shares outstanding than the average stock in the database (iii) cashflows per share exceeding the database mean; wherein said stocks create SET A; and where price-to-sales ratios are less than average for SET A; and (iv) sales that are greater than 1.5 times the database mean; (c) sorting records identifying the stocks which meet said criteria in ascending order of price-to-sales ratio into a sorted list; and (d) making available from the top of said sorted list a listing of a number of stocks.

The present invention contemplates a method for carrying out computerized selection of stocks for an investment portfolio as previously discussed, further comprising the steps of: (e) selecting a second set of stocks for an investment portfolio using the method of Strategy II; (f) making available a listing of said sets of stocks.

The present invention contemplates a method for carrying out computerized selection of stocks for an investment portfolio of Strategy XII, further comprising the steps of: (a) selecting a third set of stocks for an investment portfolio using the method of Strategy III; (b) making available a listing of said sets of stocks.

The present invention contemplates a method for carrying out computerized selection of stocks for an investment portfolio comprising the steps of: (a) accessing a database of stock information with a computer; (b) selecting stocks for an investment portfolio based on information in said database meeting certain criteria; wherein said criteria include selecting stocks of companies with database records indicating: (i) a market capitalization in excess of the database mean; (ii) price-to-sales ratios lower than 1.5; (iii) annual earnings that are higher than the previous year's annual earnings; (iv) market capitalization higher than the market capitalization three months ago; and (v) market capitalization higher than the market capitalization six months ago; (c) sorting records identifying the stocks which meet said criteria in descending order of one year appreciation in stock price into a sorted list; and (d) making available from the top of said sorted list a listing of a number of stocks The present invention contemplates a method for carrying out computerized selection of stocks for an investment portfolio comprising the steps of: (a) accessing a database of stock information with a computer; (b) selecting stocks for an investment portfolio based on information in said database meeting certain criteria; wherein said criteria include selecting stocks of companies with database records indicating: (i) a market capitalization in excess of the $25,000,000; (ii) a market capitalization not greater than $250,000,000; (ii) price-to-sales ratios lower than 1; (c) soiling records identifying the stocks which meet said criteria in descending order of one year appreciation in stock price into a sorted list; and (d) making available from the top of said sorted list a listing of a number of stocks.

The present invention contemplates a method for carrying out computerized selection of stocks for an investment portfolio comprising the steps of: (a) accessing a database of stock information with a computer; (b) selecting stocks for an investment portfolio based on information in said database meeting certain criteria; wherein said criteria include selecting stocks of companies with database records indicating: (i) a market capitalization in excess of $150,000,000; (ii) good trading liquidity; and (iii) annual earnings that are higher than the previous year's annual earnings; (iv) market capitalization higher than the market capitalization three months ago; and (v) market capitalization higher than the market capitalization six months ago; (c) sorting records identifying the stocks which meet said criteria in descending order of one year appreciation in stock price into a sorted list; and (d) making available from the top of said sorted list a listing of a number of stocks.

The present invention contemplates a method for carrying out computerized selection of stocks for an investment portfolio of Strategy VIII, further comprising the steps of: (e) selecting a second set of stocks for an investment portfolio based on information in said database meeting certain second criteria; wherein said second criteria include selecting stocks of companies with database records indicating: (i) a market capitalization in excess of the $50,000,000; (ii) earnings gains for five consecutive years; and (iii) price-to-sales ratio less than 1.5;(f) sorting records identifying the stocks in said second list which meet said criteria in descending order of one year appreciation in stock price into a sorted list; and (g) making available from the top of said sorted list a listing of a number of stocks.

The present invention contemplates a m method for carrying out computerized selection of stocks for an investment portfolio of Strategy VIII, further comprising the steps of: (e) selecting a second set of stocks for an investment portfolio using the method of Strategy II; (f) selecting a first set of stocks for an investment portfolio using the method of Strategy III; (g) making available a listing of said sets of stocks.

The present invention contemplates a method for carrying out computerized selection of stocks for an investment portfolio of Strategy VII; further comprising the steps of: (h) selecting a fourth set of stocks for an investment portfolio based on information in said database meeting certain criteria; wherein said criteria include eliminating utilities and selecting stocks of companies with database records indicating: (i) market capitalization in excess of $150,000,000; (ii) more common shares outstanding than database average; (iii) cashflow per share higher than database mean; (iv) sales greater than 1.5 times the database mean; (i) sorting records identifying the stocks in said fourth set which meet said criteria in descending order of dividend yield into a sorted list; and (j) making available from the top of said sorted list a listing of a number of stocks; (k) making available a listing of said sets of stocks.

The present invention contemplates a method for carrying out computerized selection of stocks for an investment portfolio comprising the steps of: (a) accessing a database of stock information with a computer; (b) selecting stocks for an investment portfolio based on information in said database meeting certain criteria; wherein said criteria includes market leaders with the highest dividend yields; wherein market leaders are stocks of companies that are not utilities and that have (i) a market capitalization in excess of the database mean (ii) more common shares outstanding than the average stock in the database (iii) cashflows per share exceeding the database mean; wherein said stocks create SET A; and where price-to-sales ratios are less than average for SET A; and (iv) sales that are greater than 1.5 times the database mean; (c) sorting records identifying the stocks which meet said criteria in descending order of one year appreciation in stock price into a sorted list; and (d) making available from the top of said sorted list a listing of a number of stocks.

BRIEF DESCRIPTION OF THE DRAWINGS

FIG. 7 is the list of stocks resulting from the selections made in FIG. 6.

DESCRIPTION OF A PREFERRED EMBODIMENT

Figure 1:
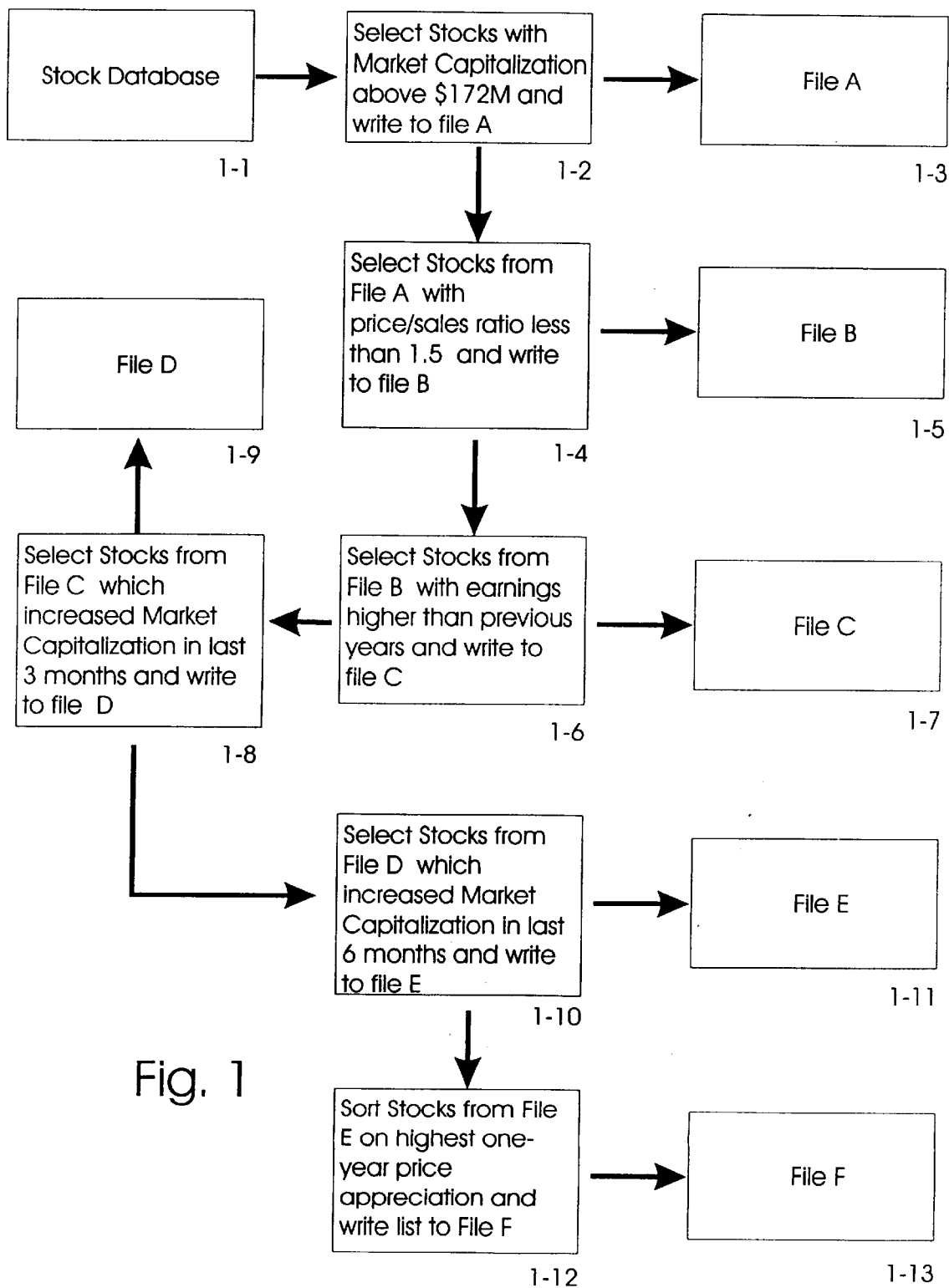
FIG. 1 is a schematic flow chart depicting the selection of stocks for a strategy of the present invention.

FIG. 1 illustrates the computer manipulation of the Stock Database for Strategy I of the present invention. This Stock Database may be any commonly used database, such as those available from Morningstar or the S&P Compustat Database. The S&P Compustat database is the presently preferred database. The Stock Database (box 1-1) is screened for stocks with a Market Capitalization above $172 million dollars (box 1-2). The resultant set in File A (box 1-3) is further screened (box 1-4) for stocks with price to sales ratios less than 1.5 in the Stock Database (box 1-1). The resultant set of stocks in File B (box 1-5) is further screened (box 1-6) for stocks with earnings higher than the previous year. The resultant set in File C (box 1-7) is further screened (box 1-8) for which increased Market Capitalization in the last three months. The resultant set in File D (box 1-9) is further screened (box 1-10) for which increased Market Capitalization in the last six months and written to File E (box 1-11). The resultant set in File E (box 1-11) is sorted (box 1-12) on highest price appreciation and written to File F (box 1-13). Note that the invention may be practiced on a wide variety of scales. Therefore, these numbers, as well as all other quantities listed in the drawing, are provided for purposes of illustration only and are not limiting.

The contents of File F (box 1-13) is output to a user so the user may then purchase stocks. Alternately, the contents of File F (box 1-13) provide input to a stock purchasing program.

Also, at File F (box 1-13) a system consultant, manager, or computer operator is optionally given a chance to manually review the list of investment stocks which were screened by criteria and stored in File F (box 1-13). The consultant may delete from or re-order the list of File F based upon factors outside the system involving stocks on the list, including recent lawsuits, regulatory changes, personnel changes, or the like. This is an optional refinement; however the preferred basic system is run automatically in a computer without this step.

The stocks, meeting certain criteria, and sorted by appropriate criteria, are selected and purchased in an evenly balanced portfolio. For example, if $1,000,000 is invested in 50 stocks, $20,000 is invested in each stock. The portfolio is held for the appropriate period, re-investing all proceeds in accordance with the original proportions as best as practicable. At the end of the period, the appropriate strategy is then applied as desired.

In a preferred embodiment, ten, twenty-five or fifty stocks are purchased, and the stocks are held for a period of one year. The portfolio is rebalanced at the end of the year in accordance with the desired investment strategy (e.g. applying the same strategy again for another year).

FIG. 1 shows a single method of performing the selection of stocks. Other methods using the same criteria, applied in a logically equivalent but different order are comprehended by this invention. Similarly, applying the criteria simultaneously is logically and functionally equivalent.

Figure 2:
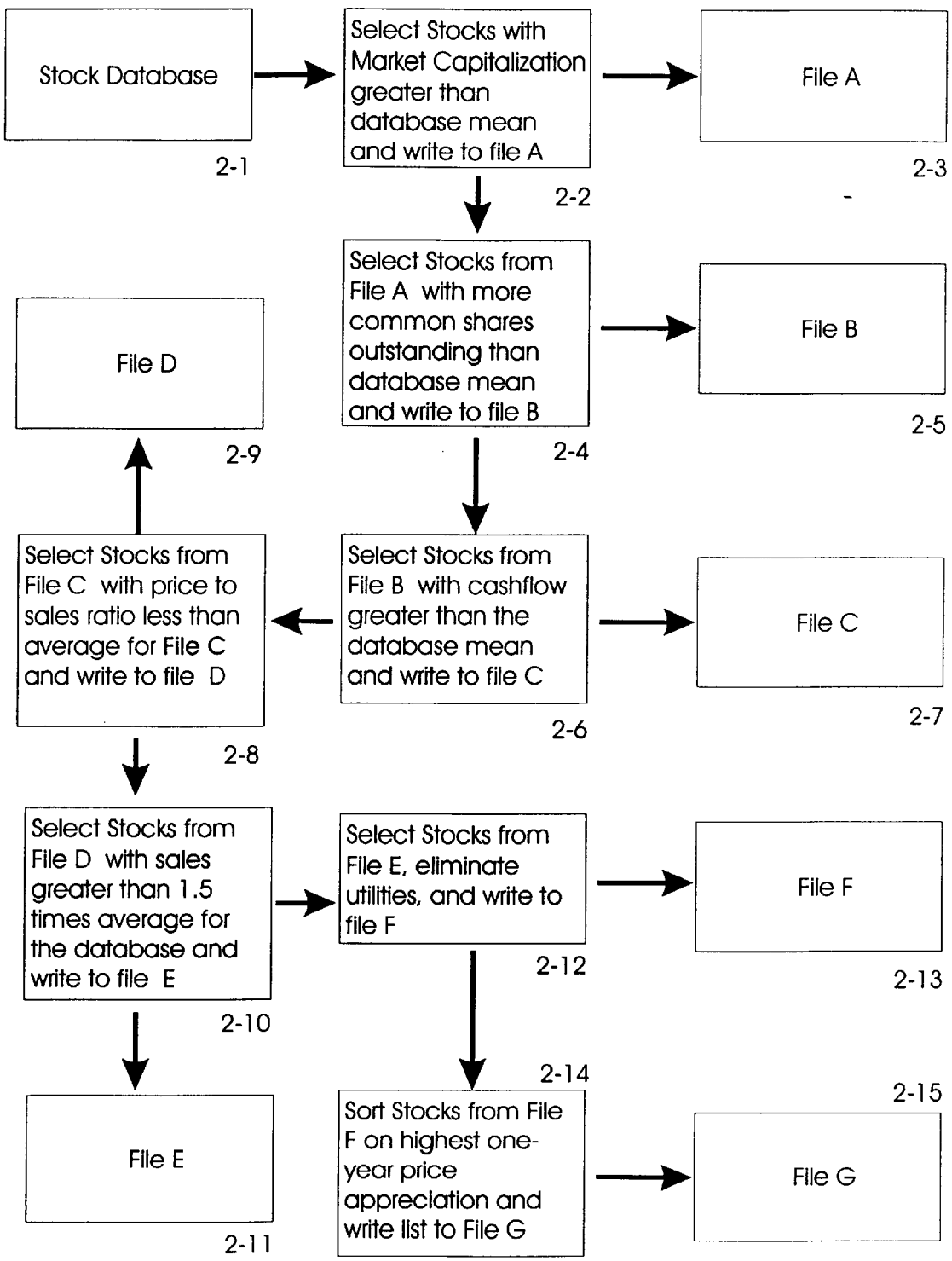
FIG. 2 is a schematic flow chart depicting the selection of stocks for a strategy of the present invention.

FIG. 2 illustrates the computer manipulation of the Stock Database for Strategy II of the present invention. This Stock Database may be any commonly used database, such as those available from Morningstar or the S&P Compustat Database. The S&P Compustat database is the presently preferred database. The Stock Database (box 2-1) is screened for stocks with a Market Capitalization greater than the database mean (box 2-2). The resultant set in File A (box 2-3) is further screened (box 2-4) for stocks with more common shares outstanding than the Stock Database (box 2-1) mean. The resultant set of stocks in File B (box 2-5) is further screened (box 2-6) for stocks with cashflow greater than the Stock Database (box 2-1) mean. The resultant set in File C (box 2-7) is further screened (box 2-8) for stocks with price to sales ratios less than the average of the stocks in File C (box 2-7). The resultant set in File D (box 2-9) is further screened (box 2-10) for stocks with sales greater than 1.5 times the average of the stocks in the Stock Database (box 2-1). The resultant set in File E (box 2-11) is further screened (box 2-12) to eliminate utilities and written to File F (box 2-13). The resultant set in File F (box 2-13) is sorted (box 2-14) on highest price appreciation and written to File G (box 2-15). Note that the invention may be practiced on a wide variety of scales. Therefore, these numbers, as well as all other quantities listed in the drawing, are provided for purposes of illustration only and are not limiting.

The contents of File F (box 2-13) is output to a user so the user may then purchase stocks. Alternately, the contents of File F (box 2-13) provide input to a stock purchasing program.

Also, at File F (box 2-13) a system consultant, manager, or computer operator is optionally given a chance to manually review the list of investment stocks which were screened by criteria and stored in File F box 2-13). The consultant may delete from or re-order the list of File F based upon factors outside the system involving stocks on the list, including recent lawsuits, regulatory changes, personnel changes, or the like. This is an optional refinement;

however the preferred basic system is run automatically in a computer without this step.

The stocks, meeting certain criteria, and sorted by appropriate criteria, are selected and purchased in an evenly balanced portfolio. For example, if $1,000,000 is invested in 50 stocks, $20,000 is invested in each stock, The portfolio is held for the appropriate period, re-investing all proceeds in accordance with the original proportions as best as practicable. At the end of the period, the appropriate strategy is then applied as desired.

In a preferred embodiment, ten, twenty-five or fifty stocks are purchased, and the stocks are held for a period of one year. The portfolio is rebalanced at the end of the year in accordance with the desired investment strategy (e.g. applying the same strategy again for another year).

FIG. 2 shows a single method of performing the selection of stocks. Other methods using the same criteria, applied in a logically equivalent but different order are comprehended by this invention. Similarly, applying the criteria simultaneously is logically and functionally equivalent.

Figure 3:
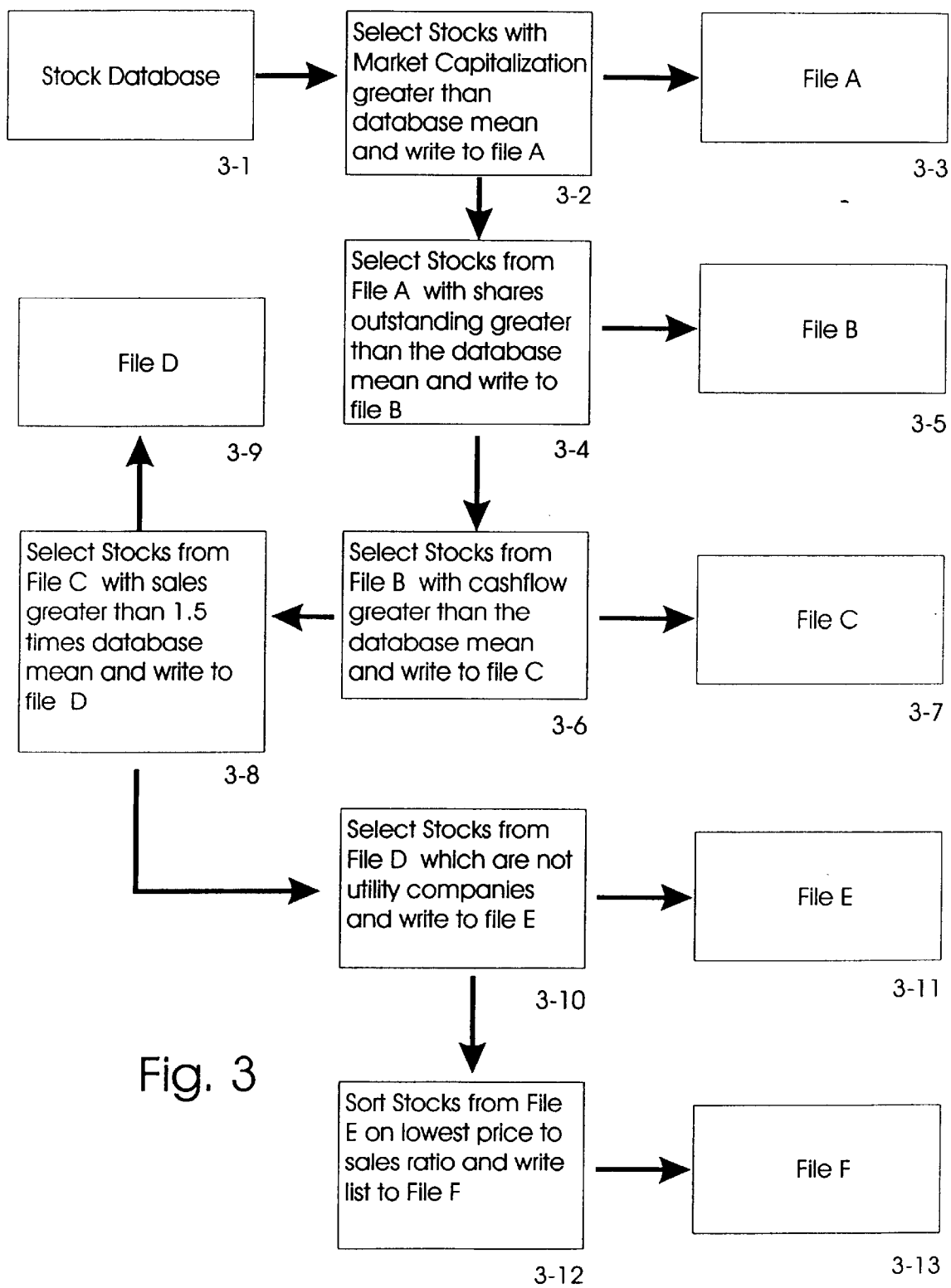
FIG. 3 is a schematic flow chart depicting the selection of stocks for a strategy of the present invention.

FIG. 3 illustrates the computer manipulation of the Stock Database for Strategy III of the present invention. This Stock Database may be any commonly used database, such as those available from Morningstar or the S&P Compustat Database. The S&P Compustat database is the presently preferred database. The Stock Database (box 3-1) is screened (box 3-2) for stocks with a Market Capitalization greater than the database mean. The resultant set in File A (box 3-3) is further screened (box 3-4) for stocks with more common shares outstanding than the Stock Database (box 3-1) mean. The resultant set of stocks in File B (box 3-5) is further screened (box 3-6) for stocks with cashflow greater than the Stock Database (box 3-1) mean. The resultant set in File C (box 3-7) is further screened (box 3-8) for stocks with sales greater than 1.5 times average for the Stock Database (box 3-1) mean. The resultant set in File D (box 3-9) is further screened (box 3-10) to eliminate utilities and written to File E (box 3-11). The resultant set in File E (box 3-11) is sorted (box 3-12) on lowest price to sales ratio and written to File F (box 3-13). Note that the invention may be practiced on a wide variety of scales. Therefore, these numbers, as well as all other quantities listed in the drawing, are provided for purposes of illustration only and are not limiting.

The contents of File F (box 3-13) is output to a user so the user may then purchase stocks. Alternately, the contents of File F (box 3-13) provide input to a stock purchasing program.

Also, at File F (box 3-13) a system consultant, manager, or computer operator is optionally given a chance to manually review the list of investment stocks which were screened by criteria and stored in File F (box 3-13). The consultant may delete from or re-order the list of File F based upon factors outside the system involving stocks on the list, including recent lawsuits, regulatory changes, personnel changes, or the like. This is an optional refinement; however the preferred basic system is run automatically in a computer without this step.

The stocks, meeting certain criteria, and sorted by appropriate criteria, are selected and purchased in an evenly balanced portfolio. For example, if $1,000,000 is invested in 50 stocks, $20,000 is invested in each stock. The portfolio is held for the appropriate period, re-investing all proceeds in accordance with the original proportions as best as practicable. At the end of the period, the appropriate strategy is then applied as desired.

In a preferred embodiment, ten, twenty-five or fifty stocks are purchased, and the stocks are held for a period of one year. The portfolio is rebalanced at the end of the year in accordance with the desired investment strategy (e.g. applying the same strategy again for another year).

FIG. 3 shows a single method of performing the selection of stocks. Other methods using the same criteria, applied in a logically equivalent but different order are comprehended by this invention. Similarly, applying the criteria simultaneously is logically and functionally equivalent.

Figure 4:
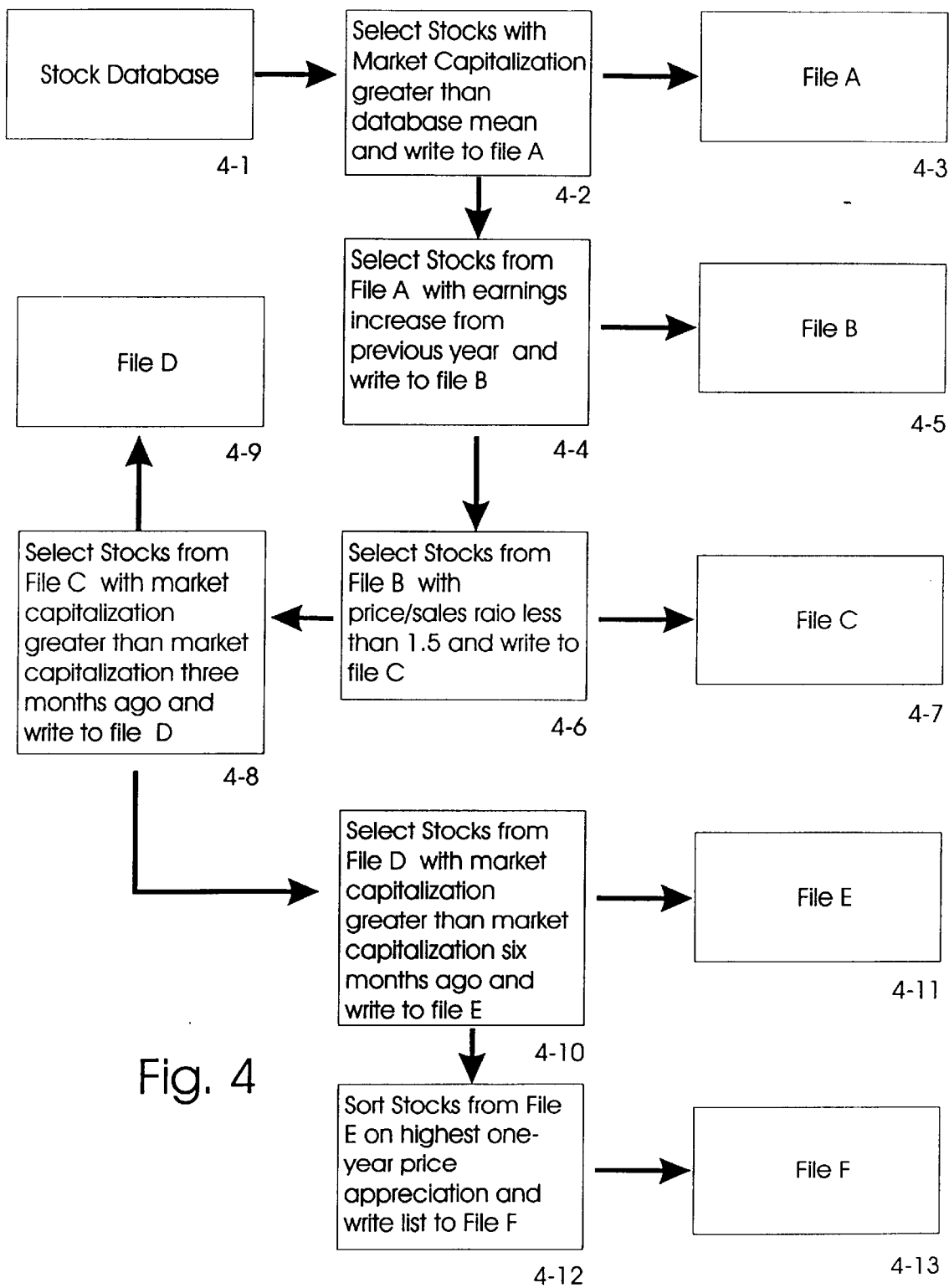
FIG. 4 is a schematic flow chart depicting the selection of stocks for a strategy of the present invention.

FIG. 4 illustrates the computer manipulation of the Stock Database for Strategy IV of the present invention. This Stock Database may be any commonly used database, such as those available from Morningstar or the S&P Compustat Database. The S&P Compustat database is the presently preferred database. The Stock Database (box 4-1) is screened (box 4-2) for stocks with a Market Capitalization greater than the Stock Database (box 4-1) mean. The resultant set in File A (box 4-3) is further screened (box 4-4) for stocks with an earnings increase in the previous year. The resultant set of stocks in File B (box 4-5) is further screened (box 4-6) for stocks with a price to sales ratio less than 1.5. The resultant set in File C (box 4-7) is further screened (box 4-8) for stocks which increased Market Capitalization in the last three months. The resultant set in File D (box 4-9) is further screened (box 4-10) for which increased Market Capitalization in the last six months and written to File E (box 4-11). The resultant set in File E (box 4-11) is sorted (box 4-12) on highest price appreciation and written to File F (box 4-13). Note that the invention may be practiced on a wide variety of scales. Therefore, these numbers, as well as all other quantities listed in the drawing, are provided for purposes of illustration only and are not limiting.

The contents of File F (box 4-13) is output to a user so the user may then purchase stocks. Alternately, the contents of File F (box 4-13) provide input to a stock purchasing program.

Also, at File F (box 4-13) a system consultant, manager, or computer operator is optionally given a chance to manually review the list of investment stocks which were screened by criteria and stored in File F (box 4-13). The consultant may delete from or re-order the list of File F based upon factors outside the system involving stocks on the list, including recent lawsuits, regulatory changes, personnel changes, or the like. This is an optional refinement; however the preferred basic system is run automatically in a computer without this step.

The stocks, meeting certain criteria, and sorted by appropriate criteria, are selected and purchased in an evenly balanced portfolio. For example, if $1,000,000 is invested in 50 stocks, $20,000 is invested in each stock. The portfolio is held for the appropriate period, re-investing all proceeds in accordance with the original proportions as best as practicable. At the end of the period, the appropriate strategy is then applied as desired.

In a preferred embodiment, ten, twenty-five or fifty stocks are purchased, and the stocks are held for a period of one year. The portfolio is rebalanced at the end of the year in accordance with the desired investment strategy (e.g. applying the same strategy again for another year).

FIG. 4 shows a single method of performing the selection of stocks. Other methods using the same criteria, applied in a logically equivalent but different order are comprehended by this invention. Similarly, applying the criteria simultaneously is logically and functionally equivalent.

Figure 5:
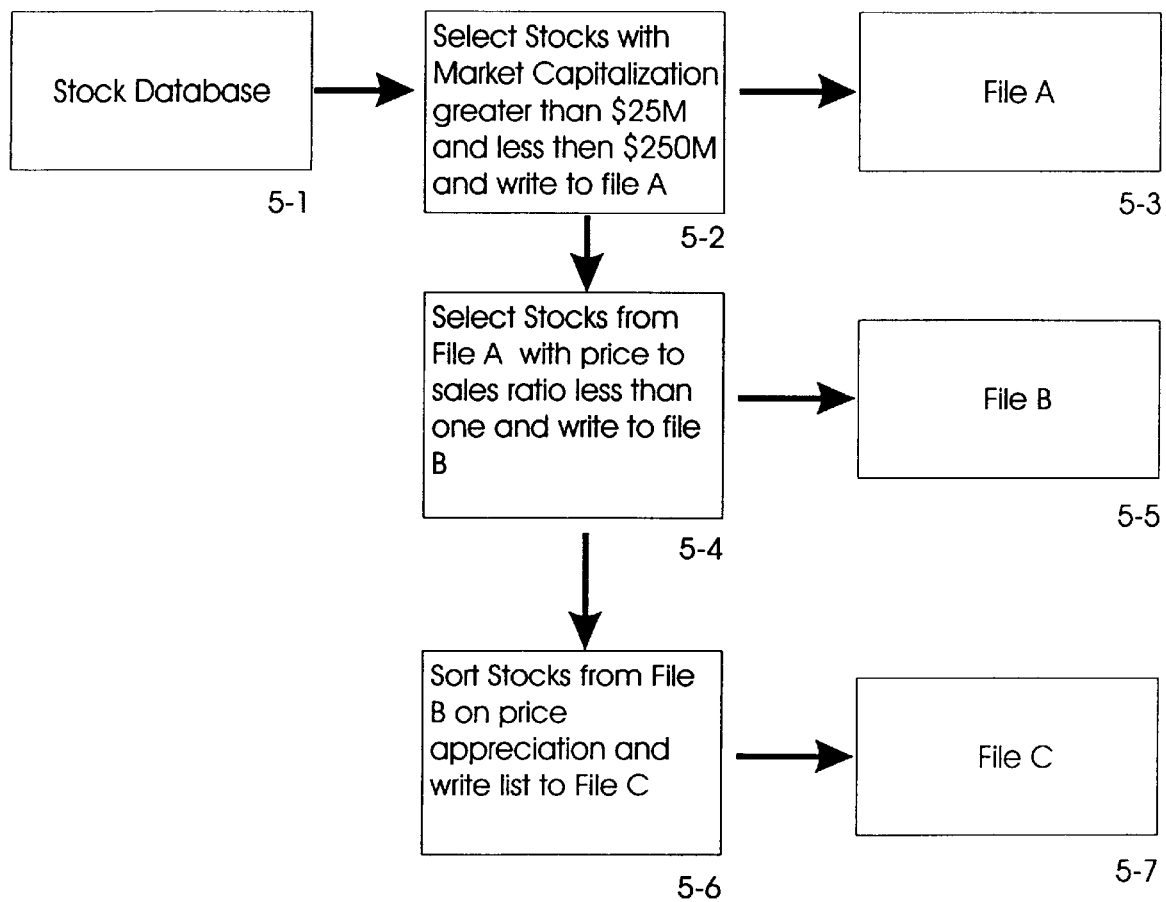
FIG. 5 is a schematic flow chart depicting the selection of stocks for a strategy of the present invention.

FIG. 5 illustrates the computer manipulation of the Stock Database for Strategy V of the present invention. This Stock Database may be any commonly used database, such as those available from Morningstar or the S&P Compustat Database. The S&P Compustat database is the presently preferred database. The Stock Database (box 5-1) is screened (box 5-2) for stocks with a Market Capitalization greater than $25 million and less than $250 million. The resultant set in File A (box 5-3) is further screened (box 5-4) for stocks with a price to sales ration of less than one. The resultant set in File B (box 5-5) is sorted (box 5-6) on price appreciation and written to File C (box 5-7). Note that the invention may be practiced on a wide variety of scales. Therefore, these numbers, as well as all other quantities listed in the drawing, are provided for purposes of illustration only and are not limiting.

The contents of File C (box 5-7) is output to a user so the user may then purchase stocks Alternately, the contents of File C (box 5-7) provide input to a stock purchasing program.

Also, at File C (box 5-7) a system consultant, manager, or computer operator is optionally given a chance to manually review the list of investment stocks which were screened by criteria and stored in File C (box 5-7). The consultant may delete from or re-order the list of File F based upon factors outside the system involving stocks on the list, including recent lawsuits, regulatory changes, personnel changes, or the like. This is an optional refinement; however the preferred basic system is run automatically in a computer without this step.

The stocks, meeting certain criteria, and sorted by appropriate criteria, are selected and purchased in an evenly balanced portfolio. For example, if $1,000,000 is invested in 50 stocks, $20,000 is invested in each stock. The portfolio is held for the appropriate period, re-investing all proceeds in accordance with the original proportions as best as practicable. At the end of the period, the appropriate strategy is then applied as desired.

In a preferred embodiment, ten, twenty-five or fifty stocks are purchased, and the stocks are held for a period of one year. The portfolio is rebalanced at the end of the year in accordance with the desired investment strategy (e.g. applying the same strategy again for another year).

FIG. 5 shows a single method of performing the selection of stocks. Other methods using the same criteria, applied in a logically equivalent but different order are comprehended by this invention. Similarly, applying the criteria simultaneously is logically and functionally equivalent.

Figure 6:
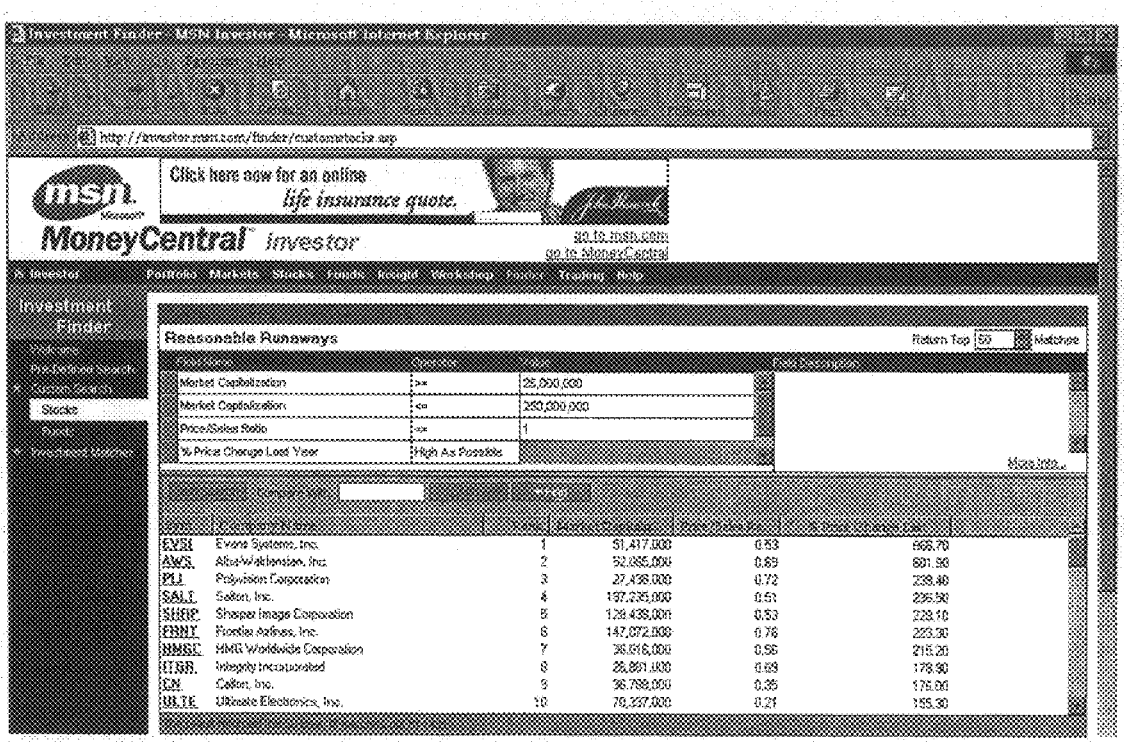
FIG. 6 is a computer screen capture of an embodiment of the present invention.

Referring now to FIG. 6 which shows a screen capture from an online investment service (Microsoft's MoneyCentral Investor—viewable on the Internet http://investor.msn.com). One of the features of this online investment search is the ability to create filters to create lists of stocks. FIG. 6 shows a screen capture of an embodiment of Strategy V. The filters used are as follows: Market Capitalization greater than or equal to 25,000,000; Market Capitalization less than or equal to 250,000,000; price/sales ratio<=1; and percentage price change last year "as high as possible." The resulting list was sorted on price change. The list was then exported to a spreadsheet and appears as FIG. 7.

Figure 8:
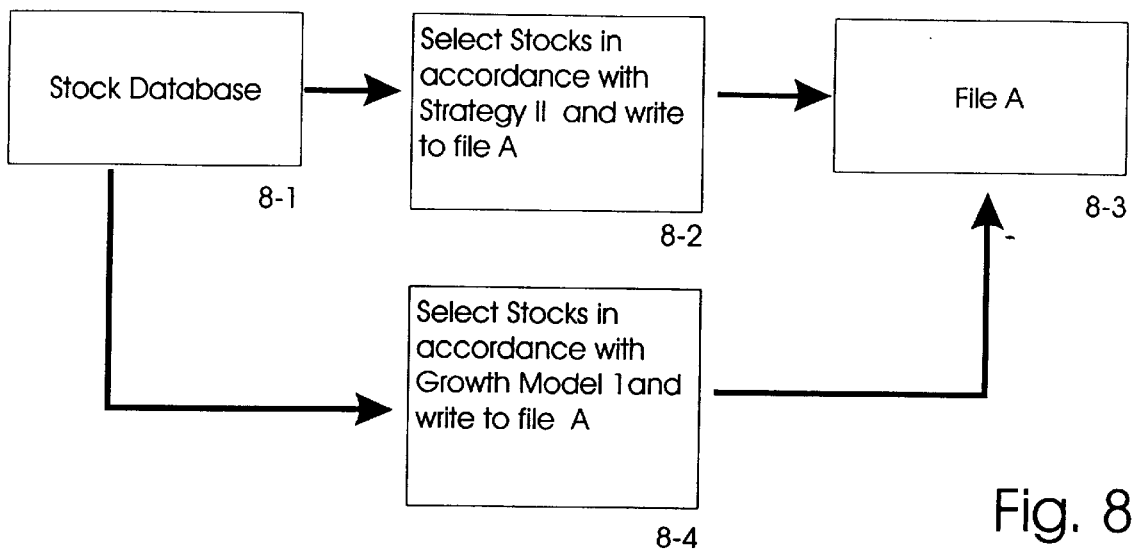
FIG. 8 is a schematic flow chart depicting the selection of stocks for a strategy of the present invention.

FIG. 8 illustrates the computer manipulation of the Stock Database for Strategy VI (concentrated growth) of the present invention. This Stock Database may be any commonly used database, such as those available from Morningstar or the S&P Compustat Database. The S&P Compustat database is the presently preferred database. The Stock Database (box 8-1) is screened (box 8-2) in accordance with Strategy II and the top ten stocks written to File A (box 8-3). The Stock Database (box 8-1) is screened (box 8-4) in accordance with Growth Model 1 (Cornerstone Growth) and the top ten stocks written to File A (box 8-3). In one embodiment, if a stock appears in both Strategy II and Growth Model 1 it is purchased twice. In another embodiment, one consults one of the original screens to make sure that twenty different stocks are selected to reduce the risks associated with a 19-stock portfolio that 'doubles down' on one of the stocks.

The contents of File A (box 8-3) is output to a user so the user may then purchase stocks. Alternately, the contents of File A (box 8-3) provide input to a stock purchasing program.

Also, at File A (box 8-3) a system consultant, manager, or computer operator is optionally given a chance to manually review the list of investment stocks which were screened by criteria and stored in File A (box 8-3). The consultant may delete from or re-order the list of File A based upon factors outside the system involving stocks on the list, including recent lawsuits, regulatory changes, personnel changes, or the like. This is an optional refinement; however the preferred basic system is run automatically in a computer without this step.

The stocks, meeting certain criteria, and sorted by appropriate criteria, are selected and purchased in an evenly balanced portfolio. For example, if $1,000,000 is invested in 20 stocks, $50,000 is invested in each stock. The portfolio is held for the appropriate period, re-investing all proceeds in accordance with the original proportions as best as practicable. At the end of the period, the appropriate strategy is then applied as desired.

In a preferred embodiment, twenty stocks are purchased, and the stocks are held for a period of one year. The portfolio is rebalanced at the end of the year in accordance with the desired investment strategy (e.g. applying the same strategy again for another year).

FIG. 8 shows a single method of performing the selection of stocks. Other methods using the same criteria, applied in a logically equivalent but different order are comprehended by this invention. Similarly, applying the criteria simultaneously is logically and functionally equivalent.

Figure 9:
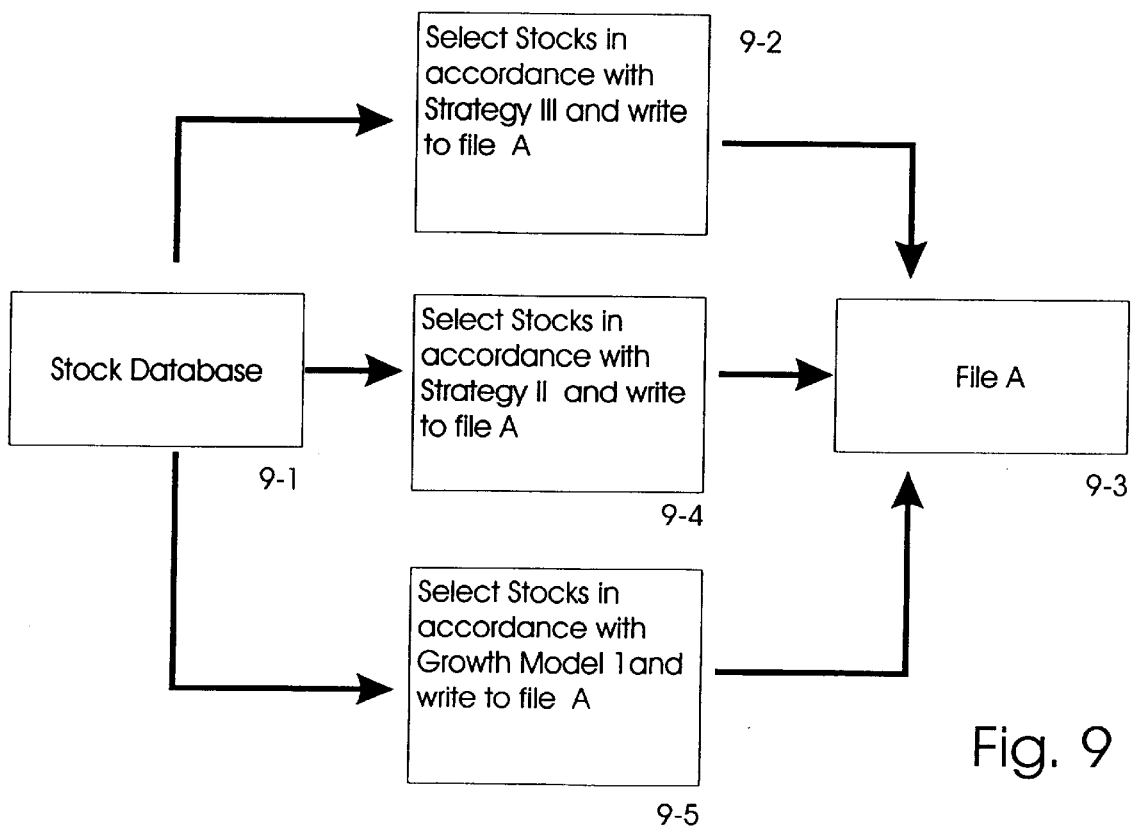
FIG. 9 is a schematic flow chart depicting the selection of stocks for a strategy of the present invention.

FIG. 9 illustrates the computer manipulation of the Stock Database for Strategy VII of the present invention. This Stock Database may be any commonly used database, such as those available from Morningstar or the S&P Compustat Database. The S&P Compustat database is the presently preferred database. The Stock Database (box 9-1) is screened (box 9-2) in accordance with Strategy VII and the top ten stocks written to File A (box 9-3). The Stock Database (box 9-1) is screened (box 9-4) in accordance with Strategy II and the top ten stocks written to File A (box 9-3). The Stock Database (box 9-1) is screened (box 9-5) in accordance with Growth Model I and the top ten stocks written to File A (box 9-3).

The contents of File A (box 9-3) is output to a user so the user may then purchase stocks. Alternately, the contents of File A (box 9-3) provide input to a stock purchasing program.

Also, at File A (box 9-3) a system consultant, manager, or computer operator is optionally given a chance to manually review the list of investment stocks which were screened by criteria and stored in File A (box 9-3). The consultant may delete from or re-order the list of File A based upon factors outside the system involving stocks on the list, including recent lawsuits, regulatory changes, personnel changes, or the like. This is an optional refinement; however the preferred basic system is run automatically in a computer without this step.

The stocks, meeting certain criteria, and sorted by appropriate criteria, are selected and purchased in an evenly balanced portfolio. For example, if $1,000,000 is invested in 20 stocks, $50,000 is invested in each stock. The portfolio is held for the appropriate period, re-investing all proceeds in accordance with the original proportions as best as practicable. At the end of the period, the appropriate strategy is then applied as desired.

In a preferred embodiment, twenty stocks are purchased, and the stocks are held for a period of one year. The portfolio is rebalanced at the end of the year in accordance with the desired investment strategy (e.g. applying the same strategy again for another year).

FIG. 9 shows a single method of performing the selection of stocks. Other methods using the same criteria, applied in a logically equivalent but different order are comprehended by this invention. Similarly, applying the criteria simultaneously is logically and functionally equivalent.

Figure 10:
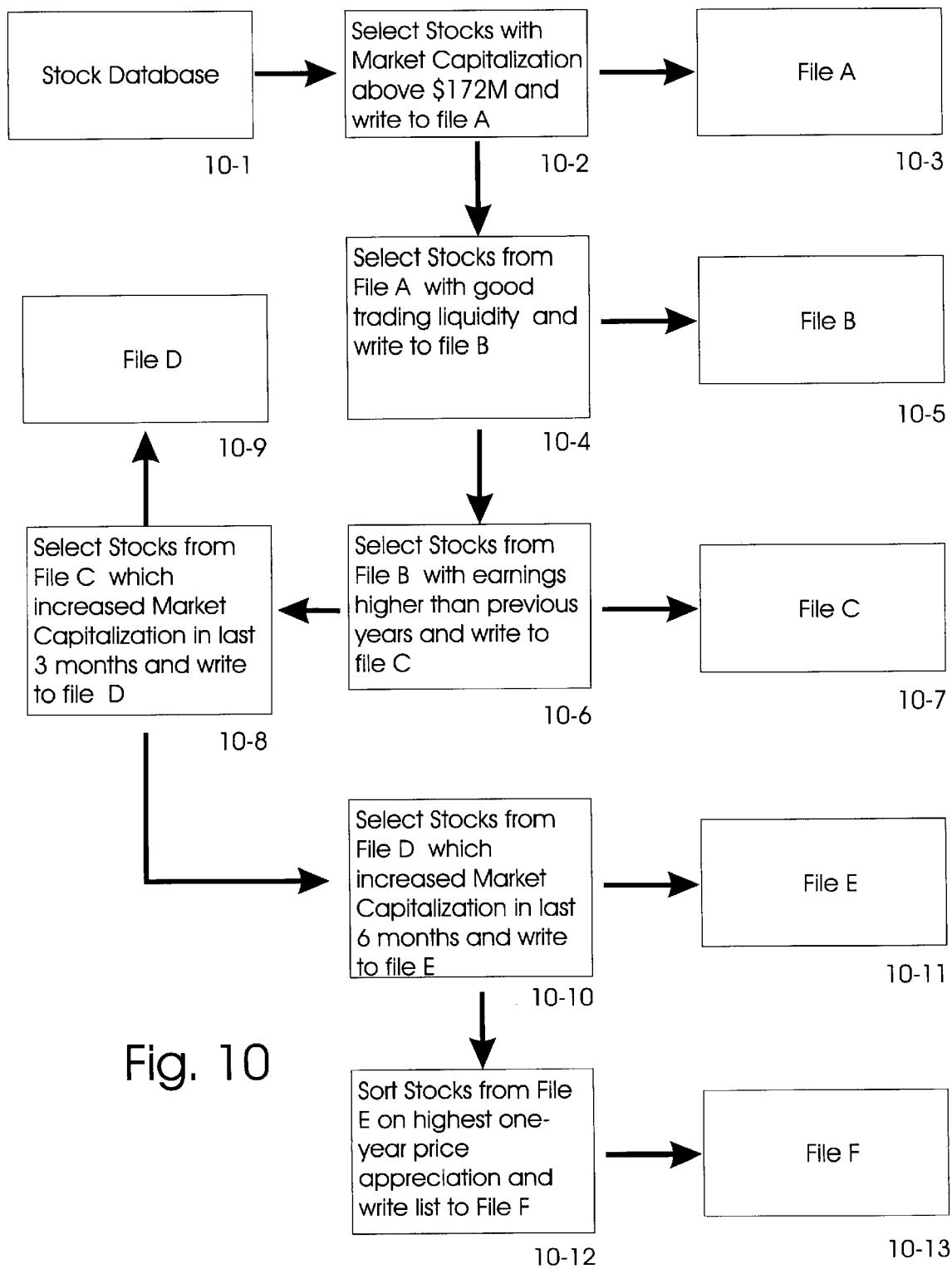
FIG. 10 is a schematic flow chart depicting the selection of stocks for a strategy of the present invention.

FIG. 10 illustrates the computer manipulation of the Stock Database for Strategy VIII of the present invention. This Stock Database may be any commonly used database, such as those available from Morningstar or the S&P Compustat Database. Starting with the All Stocks Universe, we screen for companies that have a minimum market-cap of $172 million (box 10-2), good trading liquidity (box 10-4), earnings higher than in the previous year (box 10-6), increased three month relative strength (box 10-8), increased six month relative strength (box 10-10). From these we select the 25-names with the highest one year price appreciation (box 10-12).

The stocks, meeting certain criteria, and sorted by appropriate criteria, are selected and purchased in an evenly balanced portfolio. For example, if $1,000,000 is invested in 20 stocks, $50,000 is invested in each stock. The portfolio is held for the appropriate period, re-investing all proceeds in accordance with the original proportions as best as practicable. At the end of the period, the appropriate strategy is then applied as desired.

In a preferred embodiment, twenty stocks are purchased, and the stocks are held for a period of one year. The portfolio is rebalanced at the end of the year in accordance with the desired investment strategy (e.g. applying the same strategy again for another year).

FIG. 10 shows a single method of performing the selection of stocks. Other methods using the same criteria, applied in a logically equivalent but different order are comprehended by this invention. Similarly, applying the criteria simultaneously is logically and functionally equivalent.

Figure 11:
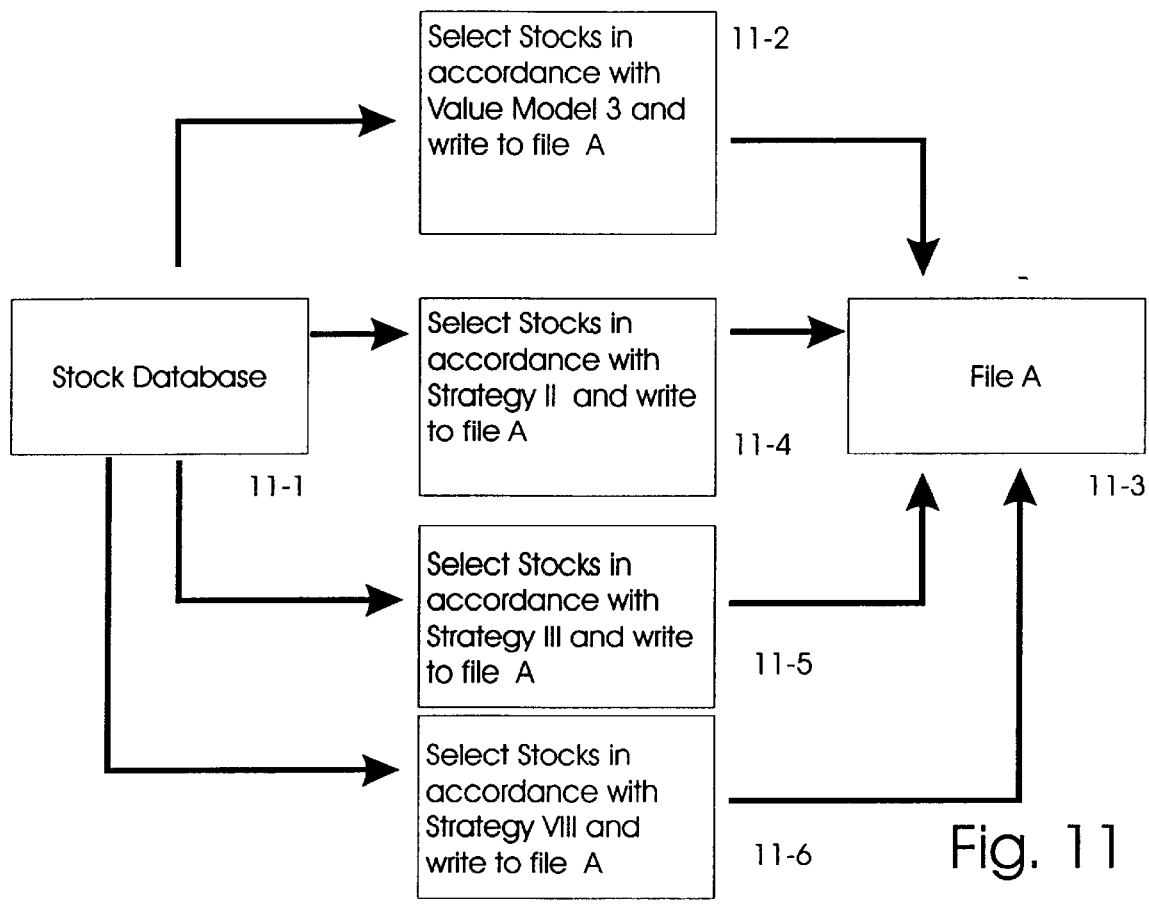
FIG. 11 is a schematic flow chart depicting the selection of stocks for a strategy of the present invention.

FIG. 11 illustrates the computer manipulation of the Stock Database for Strategy IX of the present invention. This Stock Database may be any commonly used database, such as those available from Morningstar or the S&P Compustat Database. The S&P Compustat database is the presently preferred database. The Stock Database (box 11-1) is screened (box 11-2) in accordance with Value Model 3 (domestic Cornerstone Value) and the top ten stocks written to File A (box 11-3). The Stock Database (box 11-1) is screened (box 11-4) in accordance with Strategy II and the top ten stocks written to File A (box 11-3). The Stock Database (box 11-1) is screened (box 11-5) in accordance with Strategy III (Market Leaders low Price-to-sales Ratios) and the top ten stocks written to File A (box 11-3).

The contents of File A (box 11-3) is output to a user so the user may then purchase stocks. Alternately, the contents of File A (box 11-3) provide input to a stock purchasing program.

Also, at File A (box 11-3) a system consultant, manager, or computer operator is optionally given a chance to manually review the list of investment stocks which were screened by criteria and stored in File A (box 11-3). The consultant may delete from or re-order the list of File A based upon factors outside the system involving stocks on the list, including recent lawsuits, regulatory changes, personnel changes, or the like. This is an optional refinement; however the preferred basic system is run automatically in a computer without this step.

The stocks, meeting certain criteria, and sorted by appropriate criteria, are selected and purchased in an evenly balanced portfolio. For example, if $1,000,000 is invested in 20 stocks, $50,000 is invested in each stock. The portfolio is held for the appropriate period, re-investing all proceeds in accordance with the original proportions as best as practicable. At the end of the period, the appropriate strategy is then applied as desired.

In a preferred embodiment, twenty stocks are purchased, and the stocks are held for a period of one year. The portfolio is rebalanced at the end of the year in accordance with the desired investment strategy (e.g. applying the same strategy again for another year).

FIG. 11 shows a single method of performing the selection of stocks. Other methods using the same criteria, applied in a logically equivalent but different order are comprehended by this invention. Similarly, applying the criteria simultaneously is logically and functionally equivalent.

Figure 12:
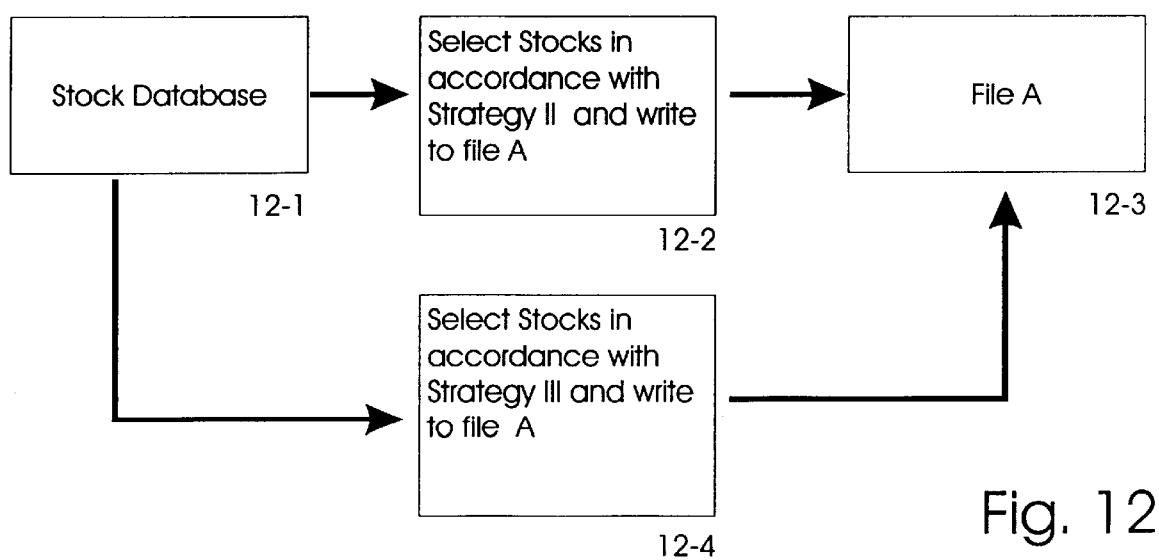
FIG. 12 is a schematic flow chart depicting the selection of stocks for a strategy of the present invention.

FIG. 12 illustrates the computer manipulation of the Stock Database for Strategy IX of the present invention. This Stock Database may be any commonly used database, such as those available from Morningstar or the S&P Compustat Database. The S&P Compustat database is the presently preferred database. The Stock Database (box 12-1) is screened (box 12-2) in accordance with Strategy II and the top ten stocks written to File A (box 12-3). The Stock Database (box 12-1) is screened (box 12-4) in accordance with Strategy III (Market Leaders low Price-to-sales Ratios) and the top ten stocks written to File A (box 12-3). In one embodiment, if a stock appears in both Strategy II and Growth Model 1 it is purchased twice. In another embodiment, one consults one of the original screens to make sure that twenty different stocks are selected to reduce the risks associated with a 19-stock portfolio that 'doubles down' on one of the stocks.

The contents of File A (box 12-3) is output to a user so the user may then purchase stocks. Alternately, the contents of File A (box 12-3) provide input to a stock purchasing program.

Also, at File A (box 12-3) a system consultant, manager, or computer operator is optionally given a chance to manually review the list of investment stocks which were screened by criteria and stored in File A (box 12-3). The consultant may delete from or re-order the list of File A based upon factors outside the system involving stocks on the list, including recent lawsuits, regulatory changes, personnel changes, or the like. This is an optional refinement; however the preferred basic system is run automatically in a computer without this step.

The stocks, meeting certain criteria, and sorted by appropriate criteria, are selected and purchased in an evenly balanced portfolio. For example, if $1,000,000 is invested in 20 stocks, $50,000 is invested in each stock. The portfolio is held for the appropriate period, re-investing all proceeds in accordance with the original proportions as best as practicable. At the end of the period, the appropriate strategy is then applied as desired.

In a preferred embodiment, twenty stocks are purchased, and the stocks are held for a period of one year. The portfolio is rebalanced at the end of the year in accordance with the desired investment strategy (e.g. applying the same strategy again for another year).

FIG. 12 shows a single method of performing the selection of stocks. Other methods using the same criteria, applied in a logically equivalent but different order are comprehended by this invention. Similarly, applying the criteria simultaneously is logically and functionally equivalent.

Figure 13:
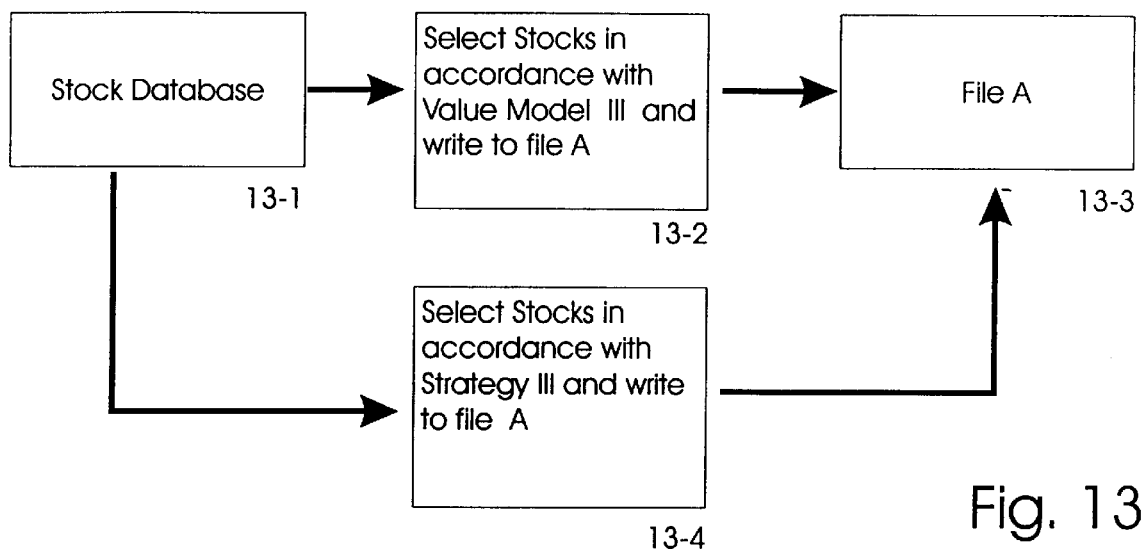
FIG. 13 is a schematic flow chart depicting the selection of stocks for a strategy of the present invention.

FIG. 13 illustrates the computer manipulation of the Stock Database for Strategy XI of the present invention. This Stock Database may be any commonly used database, such as those available from Morningstar or the S&P Compustat Database. The S&P Compustat database is the presently preferred database. The Stock Database (box 13-1) is screened (box 13-2) in accordance with Value Model 3 (the highest dividend yields from the domestic Market Leaders universe) and the top ten stocks written to File A (box 13-3). The Stock Database (box 13-1) is screened (box 13-4) in accordance with Strategy III (Market Leaders low Price-to-sales Ratios) and the top ten stocks written to File A (box 13-3). The Stock Database (box 13-1) is screened (box 13-5) in accordance with Strategy II (Market Leaders Growth) and the top ten stocks written to File A (box 13-3).

The contents of File A (box 13-3) is output to a user so the user may then purchase stocks. Alternately, the contents of File A (box 13-3) provide input to a stock purchasing program.

Also, at File A (box 13-3) a system consultant, manager, or computer operator is optionally given a chance to manually review the list of investment stocks which were screened by criteria and stored in File A (box 13-3). The consultant may delete from or re-order the list of File A based upon factors outside the system involving stocks on the list, including recent lawsuits, regulatory changes, personnel changes, or the like. This is an optional refinement; however the preferred basic system is run automatically in a computer without this step.

The stocks, meeting certain criteria, and sorted by appropriate criteria, are selected and purchased in an evenly balanced portfolio. For example, if $1,000,000 is invested in 20 stocks, $50,000 is invested in each stock. The portfolio is held for the appropriate period, re-investing all proceeds in accordance with the original proportions as best as practicable. At the end of the period, the appropriate strategy is then applied as desired.

In a preferred embodiment, twenty stocks are purchased, and the stocks are held for a period of one year. The portfolio is rebalanced at the end of the year in accordance with the desired investment strategy (e.g. applying the same strategy again for another year).

FIG. 13 shows a single method of performing the selection of stocks. Other methods using the same criteria, applied in a logically equivalent but different order are comprehended by this invention. Similarly, applying the criteria simultaneously is logically and functionally equivalent.

Figure 14:
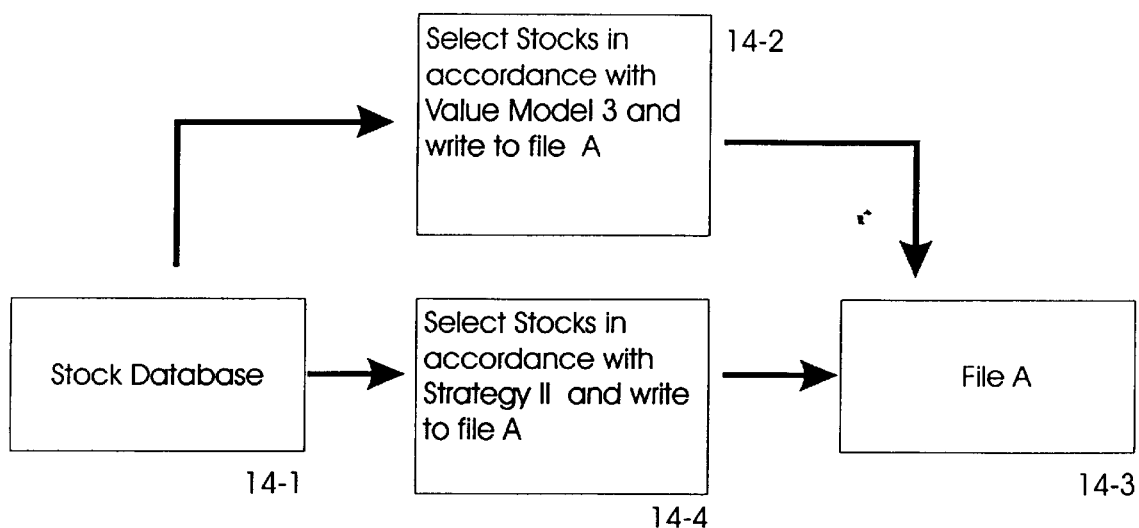
FIG. 14 is a schematic flow chart depicting the selection of stocks for a strategy of the present invention.

FIG. 14 illustrates the computer manipulation of the Stock Database for Strategy XI of the present invention. This Stock Database may be any commonly used database, such as those available from Morningstar or the S&P Compustat Database. The S&P Compustat database is the presently preferred database. The Stock Database (box 14-1) is screened (box 14-2) in accordance with Value Model 3 (the highest dividend yields from the domestic Market Leaders universe) and the top ten stocks written to File A (box 14-3). The Stock Database (box 14-1) is screened (box 14-4) in accordance with Strategy III (Market Leaders low Price-to-sales Ratios) and the top ten stocks written to File A (box 14-3). The Stock Database (box 14-1) is screened (box 14-5) in accordance with Strategy II (Market Leaders Growth) and the top ten stocks written to File A (box 14-3).

The contents of File A (box 14-3) is output to a user so the user may then purchase stocks. Alternately, the contents of File A (box 14-3) provide input to a stock purchasing program.

Also, at File A (box 14-3) a system consultant, manager, or computer operator is optionally given a chance to manually review the list of investment stocks which were screened by criteria and stored in File A (box 14-3). The consultant may delete from or re-order the list of File A based upon factors outside the system involving stocks on the list, including recent lawsuits, regulatory changes, personnel changes, or the like. This is an optional refinement; however the preferred basic system is run automatically in a computer without this step.

The stocks, meeting certain criteria, and sorted by appropriate criteria, are selected and purchased in an evenly balanced portfolio. For example, if $1,000,000 is invested in 20 stocks, $50,000 is invested in each stock. The portfolio is held for the appropriate period, re-investing all proceeds in accordance with the original proportions as best as practicable. At the end of the period, the appropriate strategy is then applied as desired.

In a preferred embodiment, twenty stocks are purchased, and the stocks are held for a period of one year. The portfolio is rebalanced at the end of the year in accordance with the desired investment strategy (e.g. applying the same strategy again for another year).

FIG. 14 shows a single method of performing the selection of stocks. Other methods using the same criteria, applied in a logically equivalent but different order are comprehended by this invention. Similarly, applying the criteria simultaneously is logically and functionally equivalent.

Figure 15:
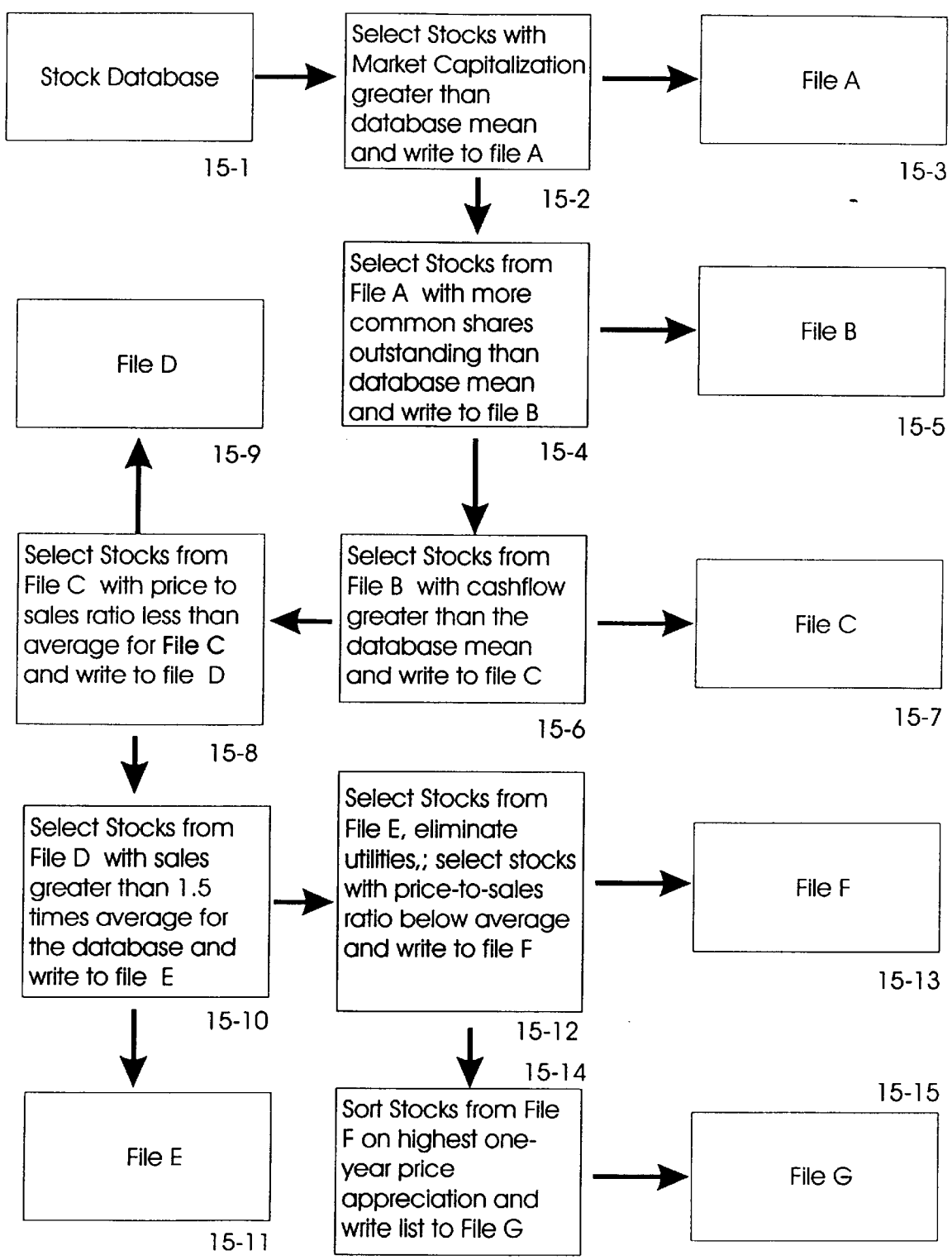
FIG. 15 is a schematic flow chart depicting the selection of stocks for a strategy of the present invention.

FIG. 15 illustrates the computer manipulation of the Stock Database for Strategy II of the present invention. This Stock Database may be any commonly used database, such as those available from Morningstar or the S&P Compustat Database. The S&P Compustat database is the presently preferred database. The Stock Database (box 15-1) is screened for stocks with a Market Capitalization greater than the database mean (box 15-2). The resultant set in File A (box 15-3) is further screened (box 154) for stocks with more common shares outstanding than the Stock Database (box 15-1) mean. The resultant set of stocks in File B (box 15-5) is further screened (box 15-6) for stocks with cashflow greater than the Stock Database (box 15-1) mean. The resultant set in File C (box 15-7) is further screened (box 15-8) for stocks with price to sales ratios less than the average of the stocks in File C (box 15-7). The resultant set in File D (box 15-9) is further screened (box 15-10) for stocks with sales greater than 1.5 times the average of the stocks in the Stock Database (box 15-1). The resultant set in File E (box 15-11) is further screened (box 15-12) to eliminate utilities and further screened to eliminate all stocks except those with below average price-to-sales ratios and then written to File F (box 15-13). The resultant set in File F (box 15-13) is sorted (box 15-14) on highest price appreciation and written to File G (box 15-15). Note that the invention may be practiced on a wide variety of scales. Therefore, these numbers, as well as all other quantities listed in the drawing, are provided for purposes of illustration only and are not limiting.

The contents of File F (box 15-13) is output to a user so the user may then purchase stocks. Alternately, the contents of File F (box 15-13) provide input to a stock purchasing program.

Also, at File F (box 15-13) a system consultant, manager, or computer operator is optionally given a chance to manually review the list of investment stocks which were screened by criteria and stored in File F (box 15-13). The consultant may delete from or re-order the list of File F based upon factors outside the system involving stocks on the list, including recent lawsuits, regulatory changes, personnel changes, or the like. This is an optional refinement; however the preferred basic system is run automatically in a computer without this step.

The stocks, meeting certain criteria, and sorted by appropriate criteria, are selected and purchased in an evenly balanced portfolio. For example, if $1,000,000 is invested in 50 stocks, $20,000 is invested in each stock. The portfolio is held for the appropriate period, re-investing all proceeds in accordance with the original proportions as best as practicable. At the end of the period, the appropriate strategy is then applied as desired.

In a preferred embodiment, fifty stocks are purchased, and the stocks are held for a period of one year. The portfolio is rebalanced at the end of the year in accordance with the desired investment strategy (e.g. applying the same strategy again for another year).

FIG. 15 shows a single method of performing the selection of stocks. Other methods using the same criteria, applied in a logically equivalent but different order are comprehended by this invention. Similarly, applying the criteria simultaneously is logically and functionally equivalent.

Figure 16:
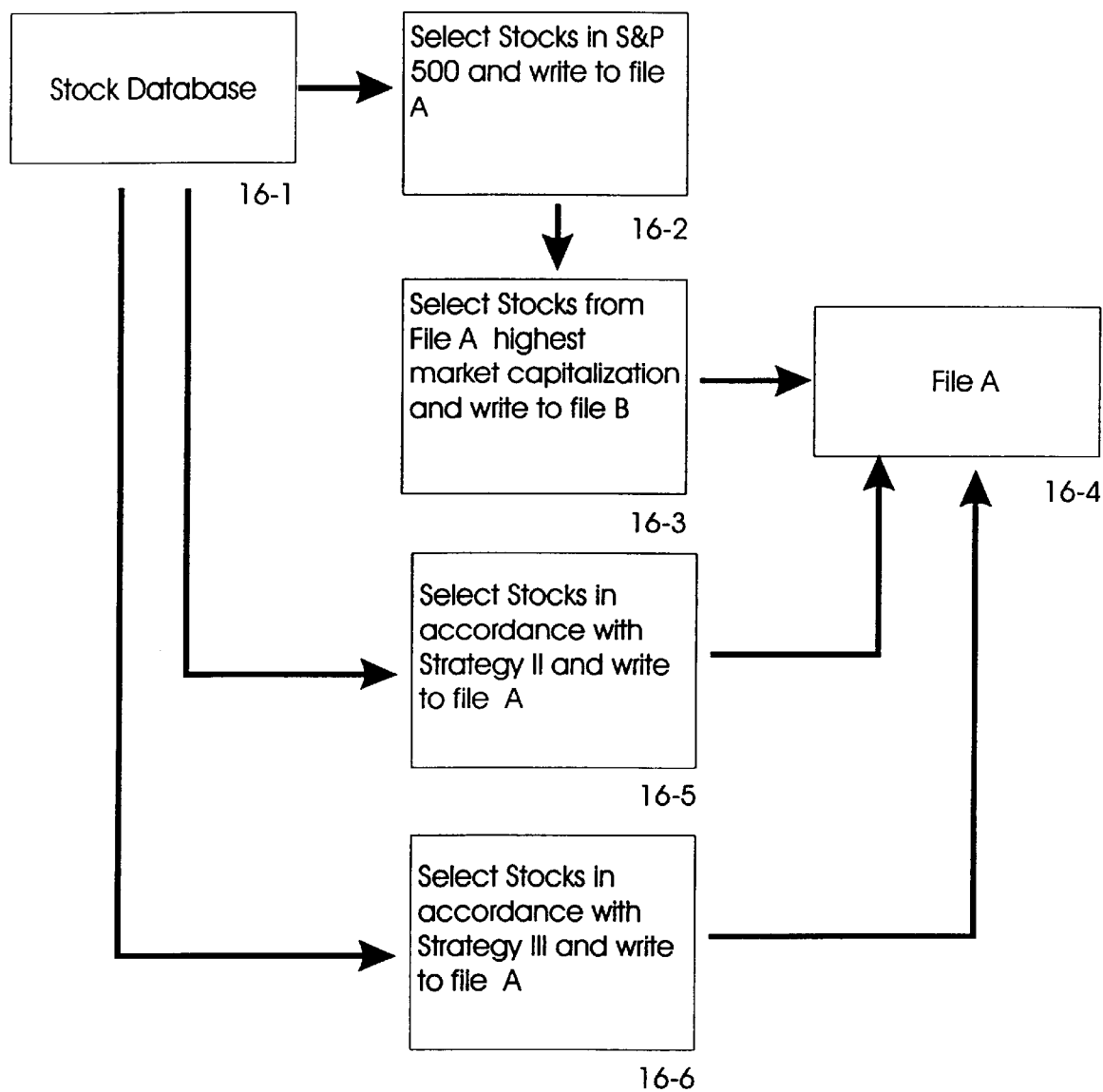
FIG. 16 is a schematic flow chart depicting the selection of stocks for a strategy of the present invention.

FIG. 16 illustrates the computer manipulation of the Stock Database for Strategy XV of the present invention. This Stock Database may be any commonly used database, such as those available from Morningstar or the S&P Compustat Database. The S&P Compustat database is the presently preferred database. The Stock Database (box 16-1) is screened for stocks in the S&P 500 (box 16-2). The stocks are further sorted by Market Capitalization (box 16-3) and the top ten stocks written to File A (box 16-4). The original Stock Database (box 16-1) is screened in accordance with Strategy II (box 16-5) and the top ten stocks written to File A (box 16-4). The original Stock Database (box 16-1) is screened in accordance with Strategy III (box 16-6) and the top ten stocks writen to File A (box 16-4).

The contents of File A (box 16-4) is output to a user so the user may then purchase stocks. Alternately, the contents of File A (box 16-4) provide input to a stock purchasing program.

Also, at File A (box 16-4) a system consultant, manager, or computer operator is optionally given a chance to manually review the list of investment stocks which were screened by criteria and stored in File A (box 16-4). The consultant may delete from or re-order the list of File F based upon factors outside the system involving stocks on the list, including recent lawsuits, regulatory changes, personnel changes, or the like. This is an optional refinement; however the preferred basic system is run automatically in a computer without this step.

Figure 17:
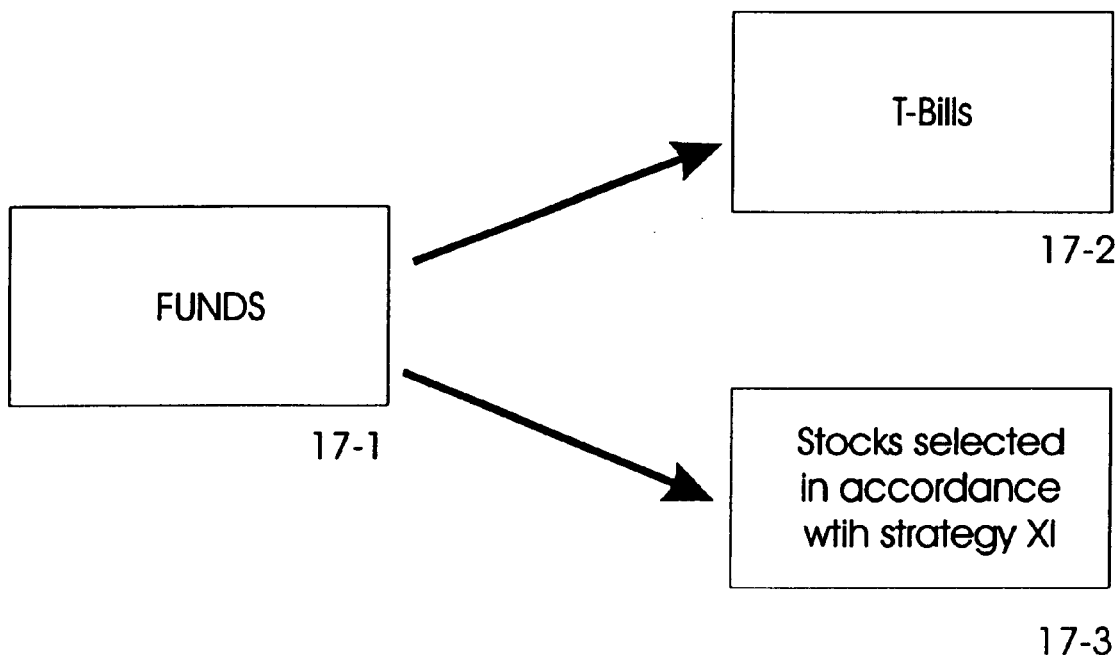
FIG. 17 is a schematic flow chart depicting the selection of stocks for a strategy of the present invention.

FIG. 17 illustrates Strategy XV of the present invention. Funds (17-1) are invested: half of funds are invested into a laddered T-bill portfolio (17-2) and half the funds are invested in accordance with Strategy XI (17-3). The stocks meeting Strategy XI are selected and purchased in an evenly balanced portfolio. For example, if $1,000,000 is invested $500,000 is placed in laddered T-Bills, and $500,000 is invested in accordance with Strategy XI. The portfolio is held for the appropriate period, re-investing all proceeds in accordance with the original proportions as best as practicable. At the end of the period, the strategy is then re-applied as desired.

While the above provides a full and complete disclosure of the preferred embodiments of this invention, equivalents may be employed without departing from the true spirit and scope of the invention. Such changes might involve alternate databases, processes, criteria, structural arrangement, capacities, sizes, operational features, reports or the like. Therefore the above description and illustrations should not be construed as limiting the scope of the invention which is defined by the appended claims.

What is claimed is:

1. A method for carrying out computerized selection of stocks for an investment portfolio comprising the steps of:
    (a) accessing a database of stock information with a computer;
    (b) selecting stocks for an investment portfolio based on information in said database meeting certain criteria; wherein said criteria include selecting stocks of companies with database records indicating: (i) market capitalization in excess of $172,000,000; (ii) price-to-sales ratios lower than 1.5; (iii) annual earnings that are higher than the previous year's annual earnings; (iv) market capitalization higher than the market capitalization three months ago; and (v) market capitalization higher than the market capitalization six months ago;
    (c) sorting records identifying the stocks which meet said criteria in descending order of one year appreciation in stock price into a sorted list; and
    (d) making available from the top of said sorted list a listing of a number of stocks.

2. A method for carrying out computerized selection of stocks for an investment portfolio comprising the steps of:
    (a) accessing a database of stock information with a computer;
    (b) selecting stocks for an investment portfolio based on information in said database meeting certain criteria; wherein said criteria includes market leaders with the highest dividend yields; wherein market leaders are stocks of companies that are not utilities and that have (i) a market capitalization in excess of the database mean (ii) more common shares outstanding than the average stock in the database (iii) cashflows per share exceeding the database mean; wherein said stocks create SET A; and where price-to-sales ratios are less than average for SET A; and (iv) sales that are 1.5 times the database mean;

(c) sorting records identifying the stocks which meet said criteria in descending order of one year appreciation in stock price into a sorted list; and (d) making available from the top of said sorted list a listing of a number of stocks.

3. A method for carrying out computerized selection of stocks for an investment portfolio of claim 2, further comprising the steps of:

(e) selecting a second set of stocks for an investment portfolio based on information in said database meeting certain criteria; wherein said criteria include eliminating utilities and selecting stocks of companies with database records indicating: (i) market capitalization in excess of $172,000,000; (ii) more common shares outstanding than database average; (iii) cashflow per share higher than database mean; (iv) sales that are greater than 1.5 times the database mean;

(f) sorting records identifying the stocks in said second set which meet said criteria in descending order of dividend yield into a sorted list; and (g) making available from the top of said sorted list a listing of a number of stocks;

(h) making available a listing of said sets of stocks.

4. The method of claim 3, further comprising the steps of:

(i) investing half of funds into a laddered T-bill portfolio;

(j) investing half of funds into stocks selected in accordance with claim 3.

5. A method for carrying out computerized selection of stocks for an investment portfolio comprising the steps of:

(a) accessing a database of stock information with a computer;

(b) selecting stocks for an investment portfolio based on information in said database meeting certain criteria; wherein said criteria includes market leaders with the highest dividend yields; wherein market leaders are stocks of companies that are not utilities and that have (i) a market capitalization in excess of the database mean (ii) more common shares outstanding than the average stock in the database (iii) cashflows per share exceeding the database mean; wherein said stocks create SET B; and where price-to-sales ratios are less than average for SET B; and (iv) sales that are greater than 1.5 times the database mean;

(c) sorting records identifying the stocks which meet said criteria in ascending order of price-to-sales ratio into a sorted list; and (d) making available from the top of said sorted list a listing of a number of stocks.

6. A method for carrying out computerized selection of stocks for an investment portfolio of claim 5, further comprising the steps of:

(e) selecting a second set of stocks for an investment portfolio based on information in said database meeting certain criteria; wherein said criteria includes market leaders with the highest dividend yields; wherein market leaders are stocks of companies that are not utilities and that have (i) a market capitalization in excess of the database mean (ii) more common shares outstanding than the average stock in the database (iii) cashflows per share exceeding the database mean; wherein said stocks create SET C; and where price-to-sales ratios are less than average for SET C; and (iv) sales that are greater than 1.5 times the database mean;

(f) sorting records identifying the stocks which meet said criteria in descending order of one year appreciation of stock price in to a sorted list; and (g) making available from the top of said sorted list a listing of a number of stocks; and (h) making available a listing of said sets of stocks.

7. A method for carrying out computerized selection of stocks for an investment portfolio of claim 2, further comprising the steps of:

(e) selecting a second set of stocks for an investment portfolio based on information in said database meeting certain criteria; wherein said criteria include eliminating utilities and selecting stocks of companies with database records indicating: (i) market capitalization in excess of $172,000,000; (ii) more common shares outstanding than database average; (iii) cashflow per share higher than database mean; (iv) sales that are greater than 1.5 times the database mean;

(f) sorting records identifying the stocks in said second set which meet said criteria in descending order of dividend yield into a sorted list;

(g) making available from the top of said sorted list a listing of a number of stocks;

(h) selecting a third set of stocks for an investment portfolio based on information in said database meeting certain criteria; wherein said criteria includes market leaders with the highest dividend yields; wherein market leaders are stocks of companies that are not utilities and that have (i) a market capitalization in excess of the database mean (ii) more common shares outstanding than the average stock in the database (iii) cashflows per share exceeding the database mean; wherein said stocks create SET D; and where price-to-sales ratios are less than average for SET D; and (iv) sales that are greater than 1.5 times the database mean;

(i) sorting records identifying the stocks which meet said criteria in ascending order of price-to-sales ratio into a sorted list; and (j) making available from the top of said sorted list a listing of a number of stocks; and (k) making available a listing of said sets of stocks.

8. A method for carrying out computerized selection of stocks for an investment portfolio comprising the steps of:

(a) accessing a database of stock information with a computer;

(b) selecting stocks for an investment portfolio based on information in said database meeting certain criteria; wherein said criteria include selecting stocks of companies with database records indicating: (i) a market capitalization in excess of the database mean; (ii) price-to-sales ratios lower than 1.5; (iii) annual earnings that are higher than the previous year's annual earnings; (iv) market capitalization higher than the market capitalization three months ago; and (v) market capitalization higher than the market capitalization six months ago;

(e) sorting records identifying the stocks which meet said criteria in descending order of one year appreciation in stock price into a sorted list; and (d) making available from the top of said sorted list a listing of a number of stocks.

9. A method for carrying out computerized selection of stocks for an investment portfolio comprising the steps of:
   (a) accessing a database of stock information with a computer;
   (b) selecting stocks for an investment portfolio based on information in said database meeting certain criteria; wherein said criteria include selecting stocks of companies with database records indicating: (i) a market capitalization in excess of the $25,000,000; (ii) a market capitalization not greater than $250,000,000; (ii) price-to-sales ratios lower than 1;
   (c) sorting records identifying the stocks which meet said criteria in descending order of one year appreciation in stock price into a sorted list; and
   (d) making available from the top of said sorted list a listing of a number of stocks.

10. A method for carrying out computerized selection of stocks for an investment portfolio comprising the steps of:
    (a) accessing a database of stock information with a computer;
    (b) selecting stocks for an investment portfolio based on information in said database meeting certain criteria; wherein said criteria include selecting stocks of companies with database records indicating: (i) a market capitalization in excess of $150,000,000; (ii) good trading liquidity; and (iii) annual earnings that are higher than the previous year's annual earnings; (iv) market capitalization higher than the market capitalization three months ago; and (v) market capitalization higher than the market capitalization six months ago;
    (c) sorting records identifying the stocks which meet said criteria in descending order of one year appreciation in stock price into a sorted list; and
    (d) making available from the top of said sorted list a listing of a number of stocks.

11. A method for carrying out computerized selection of stocks for an investment portfolio of claim 10, further comprising the steps of:
    (e) selecting a second set of stocks for an investment portfolio based on information in said database meeting certain second criteria; wherein said second criteria include selecting stocks of companies with database records indicating: (i) a market capitalization in excess of the $150,000,000; (ii) earnings gains for five consecutive years; and (iii) price-to-sales ratio less than 1.5;
    (f) sorting records identifying the stocks in said second list which meet said criteria in descending order of one year appreciation in stock price into a sorted list; and
    (g) making available from the top of said sorted list a listing of a number of stocks.

12. A method of carrying out computerized selection of stocks for an investment portfolio of claim 10, further comprising the steps of:
    (e) selecting a second set of stocks for an investment portfolio based on information in said database meeting certain criteria; wherein said criteria includes market leaders with the highest dividend yields; wherein market leaders are stocks of companies that are not utilities and that have (i) a market capitalization in excess of the database mean (ii) more common shares outstanding than the average stock in the database (iii) cashflows per share exceeding the database mean; wherein said stocks create SET E; and where price-to-sales ratios are less than average for SET E; and (iv) sales that are greater than 1.5 times the database mean;
    (f) sorting records identifying the stocks which meet said criteria in descending order of one year appreciation in stock price into a sorted list;
    (g) making available from the top of said sorted list a listing of a number of stocks;
    (h) selecting a third set of stocks for an investment portfolio based on information in said database meeting certain criteria; wherein said criteria includes market leaders with the highest dividend yields; wherein market leaders are stocks of companies that are not utilities and that have (i) a market capitalization in excess of the database mean (ii) more common shares outstanding than the average stock in the database (iii) cashflows per share exceeding the database mean; wherein said stocks create SET F; and where price-to-sales ratios are less than average for SET F; and (iv) sales that are greater than 1.5 times the database mean;
    (i) sorting records identifying the stocks which meet said criteria in ascending order of price-to-sales ratio into a sorted list; and
    (j) making available from the top of said sorted list a listing of a number of stocks; and
    (k) making available a listing of said sets of stocks.

13. A method for carrying out computerized selection of stocks for an investment portfolio of claim 10, further comprising the steps of:
    (e) selecting s second set of stocks for an investment portfolio based on information in said database meeting certain criteria; wherein said criteria includes market leaders with the highest dividend yields; wherein market leaders are stocks of companies that are not utilities and that have (i) a market capitalization in excess of the database mean (ii) more common shares outstanding than the average stock in the database (iii) cashflows per share exceeding the database mean; wherein said stocks create SET G; and where price-to-sales ratios are less than average for SET G; and (iv) sales that are greater than 1.5 times the database mean;
    (f) sorting records identifying the stocks which meet said criteria in descending order of one year appreciation in stock price into a sorted list;
    (g) making available from the top of said sorted list a listing of a number of stocks;
    (h) selecting a third set of stocks for an investment portfolio based on information in said database meeting certain criteria; wherein said criteria includes market leaders with the highest dividend yields; wherein market leaders are stocks of companies that are not utilities and that have (i) a market capitalization in excess of the database mean (ii) more common shares outstanding than the average stock in the database (iii) cashflows per share exceeding the database mean; wherein said stocks create SET H; and where price-to-sales ratios are less than average for SET H; and (iv) sales that are greater than 1.5 times the database mean;
    (i) sorting records identifying the stocks which meet said criteria in ascending order of price-to-sales ratio into a sorted list;
    (j) making available from the top of said sorted list a listing of a number of stocks;
    (k) selecting a fourth set of stocks for an investment portfolio based on information in said database meeting certain criteria; wherein said criteria include eliminating utilities and selecting stocks of companies with database records indicating: (i) market capitalization in excess of $150,000,000; (ii) more common shares outstanding than database average; (iii) cashflow per share higher than database mean; (iv) sales that are greater than 1.5 times the database mean;

(l) sorting records identifying the stocks in said fourth set which meet said criteria in descending order of dividend yield into a sorted list;

(m) making available from the top of said sorted list a listing of a number of stocks; and (n) making available a listing of said sets of stocks.

14. The method of claim 7, further comprising the steps of:

(l) investing half of funds into a laddered T-bill portfolio; and (m) investing half of funds into stocks selected in accordance with claim 7.

15. A computer programmed to carry out the steps of claim 1.

16. A computer-readable medium having imprinted therein a computer program containing instruction steps such that upon installation of said computer program in a general purpose computer, the computer is capable of performing the method of claim 1.

17. A computer programmed to carry out the steps of claim 2.

18. A computer-readable medium having imprinted therein a computer program containing instruction steps such that upon installation of said computer program in a general purpose computer, the computer is capable of performing the method of claim 2.

19. A computer programmed to carry out the steps of claim 5.

20. A computer-readable medium having imprinted therein a computer program containing instruction steps such that upon installation of said computer program in a general purpose computer, the computer is capable of performing the method of claim 5.

21. A computer programmed to carry out the steps of claim 8.

22. A computer-readable medium having imprinted therein a computer program containing instruction steps such that upon installation of said computer program in a general purpose computer, the computer is capable of performing the method of claim 8.

23. A computer programmed to carry out the steps of claim 9.

24. A computer-readable medium having imprinted therein a computer program containing instruction steps such that upon installation of said computer program in a general purpose computer, the computer is capable of performing the method of claim 9.

25. A computer programmed to carry out the steps of claim 10.

26. A computer-readable medium having imprinted therein a computer program containing instruction steps such that upon installation of said computer program in a general purpose computer, the computer is capable of performing the method of claim 10.

* * * * *